US008601593B2

(12) United States Patent
Muranaka et al.

(10) Patent No.: US 8,601,593 B2
(45) Date of Patent: Dec. 3, 2013

(54) NETWORK NODE, INFORMATION PROCESSING SYSTEM, AND METHOD

(75) Inventors: Nobuyuki Muranaka, Kokubunji (JP); Yuji Ogata, Saitama (JP); Koki Nakashiro, Atsugi (JP); Masaki Yamada, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 12/946,938

(22) Filed: Nov. 16, 2010

(65) Prior Publication Data

US 2011/0203001 A1    Aug. 18, 2011

(30) Foreign Application Priority Data

Feb. 15, 2010    (JP) .................................. 2010-029898

(51) Int. Cl.
*G06F 21/10*    (2013.01)

(52) U.S. Cl.
USPC ........................................................ 726/26

(58) Field of Classification Search
None
See application file for complete search history.

(56) References Cited

U.S. PATENT DOCUMENTS

| 7,908,664 | B2* | 3/2011 | Kishimoto | 726/27 |
| 8,117,665 | B2* | 2/2012 | Kawabuchi et al. | 726/28 |
| 8,181,256 | B2* | 5/2012 | Hikichi et al. | 726/26 |
| 2003/0223363 | A1 | 12/2003 | Sato | |
| 2005/0225792 | A1* | 10/2005 | Morita | 358/1.14 |
| 2007/0167148 | A1* | 7/2007 | Ishikawa et al. | 455/405 |
| 2008/0130042 | A1* | 6/2008 | Iizuka et al. | 358/1.15 |
| 2008/0168437 | A1* | 7/2008 | Chen et al. | 717/176 |
| 2008/0183841 | A1* | 7/2008 | Isokawa et al. | 709/217 |
| 2008/0229327 | A1 | 9/2008 | Yoshida | |
| 2008/0320317 | A1* | 12/2008 | Funahashi et al. | 713/189 |
| 2009/0027725 | A1* | 1/2009 | Okazawa et al. | 358/1.15 |
| 2009/0268912 | A1* | 10/2009 | Nakae | 380/270 |
| 2010/0064289 | A1 | 3/2010 | Oe et al. | |
| 2010/0263044 | A1* | 10/2010 | Yamada | 726/17 |
| 2010/0332563 | A1* | 12/2010 | Fujikawa | 707/813 |

FOREIGN PATENT DOCUMENTS

| JP | 2001-265461 | | 9/2001 |
| JP | 2002-278937 | | 9/2002 |
| JP | 2003-044297 | | 2/2003 |
| JP | 2005-242831 | | 9/2005 |
| JP | 2005242831 | A * | 9/2005 |
| JP | 2008-233947 | | 10/2008 |
| JP | 2008233947 | A * | 10/2008 |

OTHER PUBLICATIONS

Office Action in CN 201010551119.X, dispatched Mar. 26, 2013, (6 pgs., in Chinese); [partial English language translation].

* cited by examiner

*Primary Examiner* — Andrew L Nalven
*Assistant Examiner* — Christopher Ruprecht
(74) *Attorney, Agent, or Firm* — Antonelli, Terry, Stout & Kraus, LLP.

(57) ABSTRACT

The consistency between an application output destination and a permitted user for an I/O device section is ensured when a user deploys an application for processing and outputting input data onto an entrance node. The entrance node includes an output destination/user table that manages correspondence between an application output destination and a user. The output destination/user table stores information about the output destination used for each user who uses the entrance node. An application deployment management function of a processing section in the entrance node determines whether application deployment can be accepted from a user. To do this, the application deployment management function specifies a user corresponding to the output destination for the application from the output destination/user table and verifies that the user is consistent with a user permitted for an I/O device in the I/O device section used by the application.

14 Claims, 28 Drawing Sheets

| I/O DEVICE ID | I/O DEVICE NAME | CONNECTION | I/O DEVICE ADDRESS | OWNER | PERMITTED USER |
|---|---|---|---|---|---|
| Dev-1 | IP CAMERA 1 | TCP/IP | IP 192.168.***.11, Port 10011 | USER A | USER A |
| Dev-2 | IP CAMERA 2 | TCP/IP | IP 192.168.***.12, Port 10012 | USER A | USER A USER B |
| :: | :: | :: | :: | :: | :: |

| APPLICATION ID | APPLICATION NAME | DEPLOYING USER | I/O DEVICE ID | I/O DEVICE NAME | OUTPUT DESTINATION |
|---|---|---|---|---|---|
| AP-1 | MOVING IMAGE PROCESSING | USER A | Dev-1 | IP CAMERA 1 | ip 10.*.*.20 port 10020 |
| AP-2 | MOVING IMAGE PROCESSING | USER A | Dev-2 | IP CAMERA 2 | ip 10.*.*.30 port 10030 |
| :: | :: | :: | :: | :: | :: |

| REGISTRATION ID | USER | OUTPUT DESTINATION |
|---|---|---|
| #1 | USER A | IP 10.*.*.20-29<br>Port 10020 |
| #2 | USER B | IP 10.*.*.30-39<br>Port 10030 |
| #3 | USER C | IP 10.*.*.40-49<br>Port 10040 |
| : | : | : |

FIG. 11

| APPLICATION ID 1101 | APPLICATION NAME 1102 | DEPLOYING USER 1103 | I/O DEVICE ID 1104 | I/O DEVICE NAME 1105 | OUTPUT DESTINATION 1106 | USED PATH 1107 |
|---|---|---|---|---|---|---|
| AP-1 | MOVING IMAGE PROCESSING | USER A | Dev-1 | IP CAMERA 1 | ip 10.*.*.20 port 10020 | BUSINESS PATH-1 |
| AP-2 | MOVING IMAGE PROCESSING | USER B | Dev-2 | IP CAMERA 2 | ip 10.*.*.30 port 10030 | BUSINESS PATH-2 |
| .. | .. | .. | .. | .. | .. | .. |

| I/O DEVICE ID 1501 | I/O DEVICE NAME 1502 | CONNECTION 1503 | I/O DEVICE ADDRESS 1504 | OWNER 1505 | PERMITTED USER 1506 | DOMAIN NAME FOR PERMITTED USER 1507 |
|---|---|---|---|---|---|---|
| Dev-1 | IP CAMERA 1 | TCP/IP | IP 192.168.***.11, Port 10011 | USER A | USER A | ***.userA.hostname.com |
| Dev-2 | IP CAMERA 2 | TCP/IP | IP 192.168.***.12, Port 10012 | USER A | USER A USER B | ***.userA.hostname.com ***.userB.hostname.com |
| .. | .. | .. | .. | .. | .. | .. |

| APPLICATION ID 1601 | APPLICATION NAME 1602 | DEPLOYING USER 1603 | I/O DEVICE ID 1604 | I/O DEVICE NAME 1605 | OUTPUT DESTINATION 1606 | DESTINATION USER 1607 |
|---|---|---|---|---|---|---|
| AP-1 | MOVING IMAGE PROCESSING | USER A | Dev-1 | IP CAMERA 1 | IP ap1.userA.hostname.com Port 10020 | USER A |
| AP-2 | MOVING IMAGE PROCESSING | USER B | Dev-2 | IP CAMERA 2 | IP ap2.userB.hostname.com Port 10030 | USER B |
| .. | .. | .. | .. | .. | .. | .. |

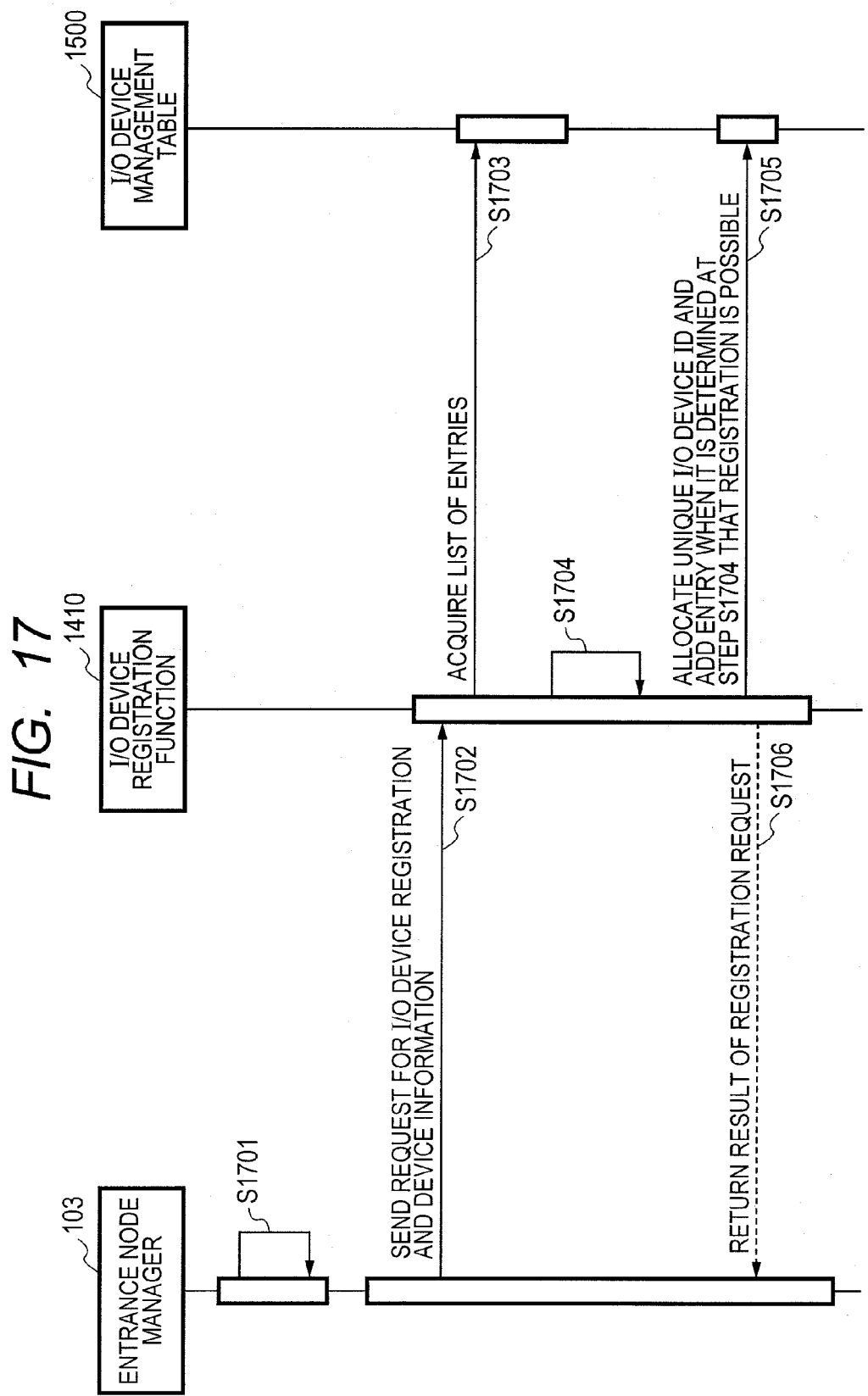

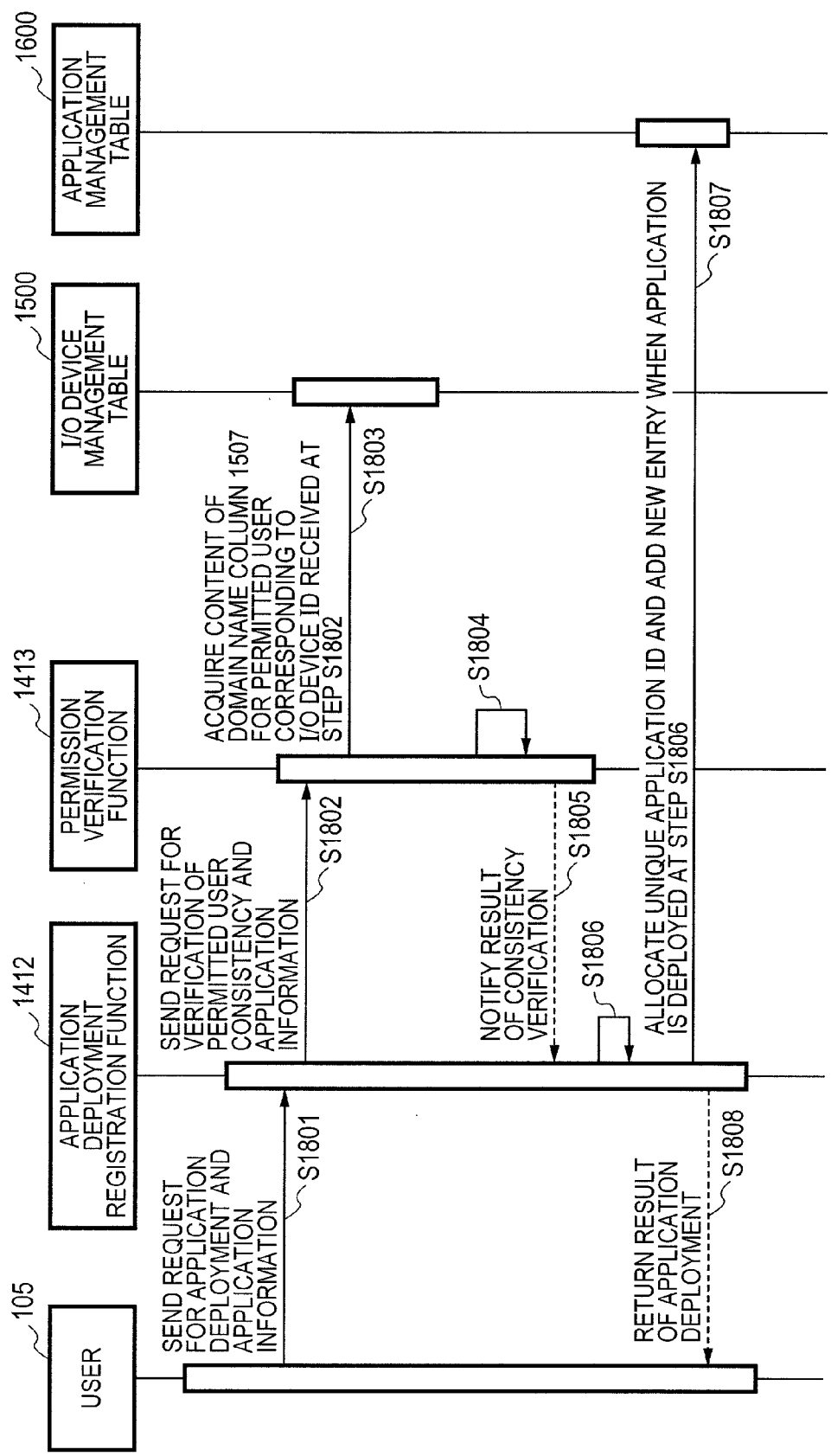

FIG. 24

| I/O DEVICE ID 2401 | I/O DEVICE NAME 2402 | CONNECTION 2403 | I/O DEVICE ADDRESS 2404 | OWNER 2405 | API 2406 | PERMITTED USER 2407 |
|---|---|---|---|---|---|---|
| Dev-1 | IP CAMERA 1 | TCP/IP | IP 192.168.***.11, Port 10011 | USER A | IMAGE CAPTURE API | USER A |
|  |  |  |  |  | DIRECTION CHANGE ACTUATOR API | USER A |
| Dev-2 | IP CAMERA 2 | TCP/IP | IP 192.168.***.12, Port 10012 | USER A | IMAGE CAPTURE API | USER A USER B |
|  |  |  |  |  | DIRECTION CHANGE ACTUATOR API | USER A |
| .. | .. | .. | .. | .. | .. | .. |

| APPLICATION ID 2501 | APPLICATION NAME 2502 | DEPLOYING USER 2503 | I/O DEVICE ID 2504 | I/O DEVICE NAME 2505 | API 2506 | OUTPUT DESTINATION 2507 |
|---|---|---|---|---|---|---|
| AP-11 | MOVING IMAGE PROCESSING | USER A | Dev-1 | IP CAMERA 1 | IMAGE CAPTURE API | ip 10.*.*.20 port 10020 |
| AP-12 | MOVING IMAGE PROCESSING | USER B | Dev-2 | IP CAMERA 2 | IMAGE CAPTURE API | ip 10.*.*.30 port 10030 |
| .. | .. | .. | .. | .. | .. | .. |

| APPLICATION ID 2601 | APPLICATION NAME 2602 | DEPLOYING USER 2603 | I/O DEVICE ID 2604 | I/O DEVICE NAME 2605 | ACCESS-PERMITTED USER 2606 |
|---|---|---|---|---|---|
| AP-21 | IMAGE RECORDER | USER A | Dev-1 | IP CAMERA 1 | USER A |
| AP-22 | IMAGE RECORDER | USER B | Dev-2 | IP CAMERA 2 | USER A USER B |
| .. | .. | .. | .. | .. | .. |

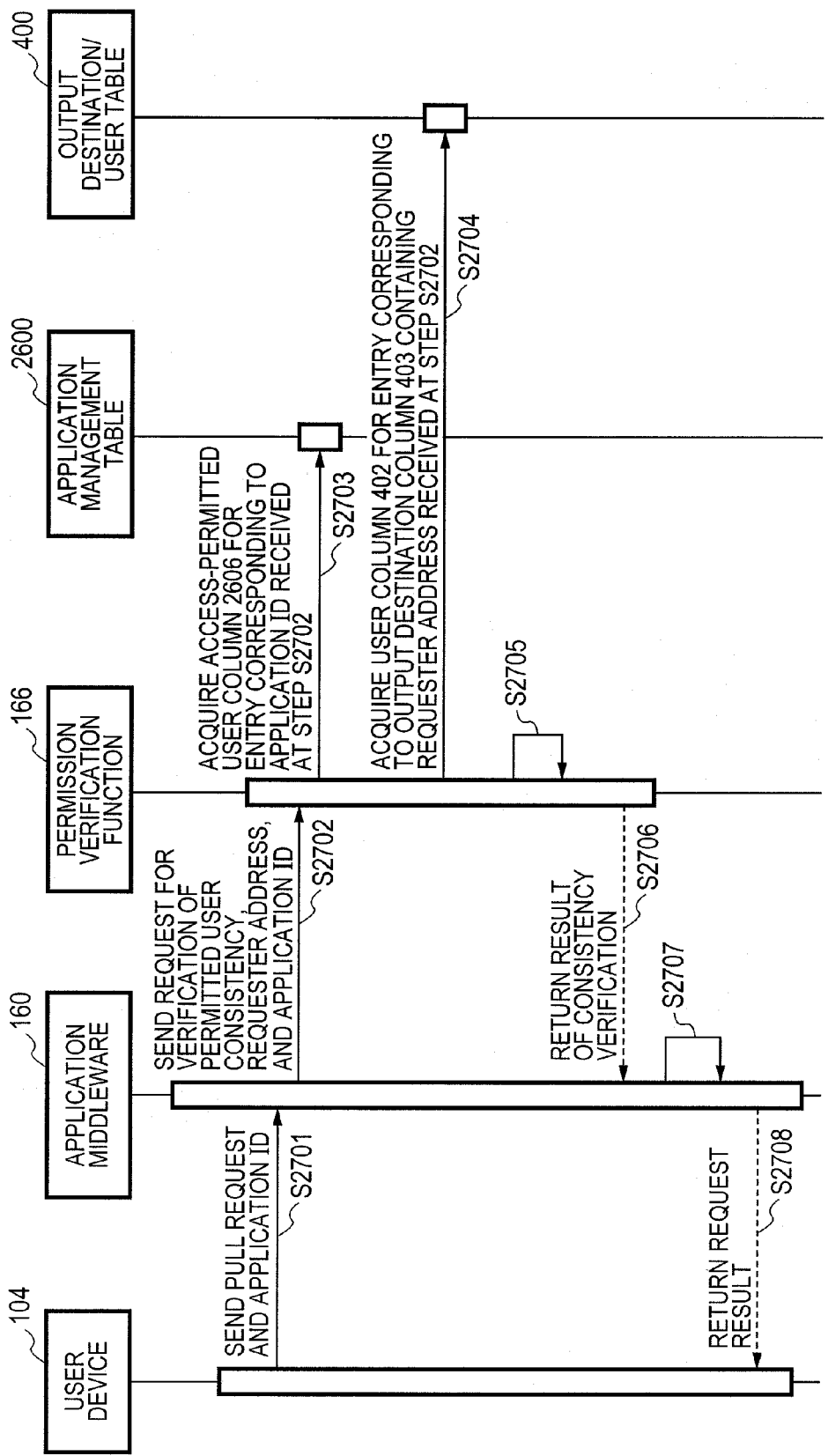

FIG. 30

| APPLICATION OPERATING MODULE NUMBER 3001 | I/O DEVICE ID 3002 | I/O DEVICE NAME 3003 | CONNECTION 3004 | I/O DEVICE ADDRESS 3005 | OWNER 3006 | PERMITTED USER 3007 |
|---|---|---|---|---|---|---|
| Func-1 | Dev-1-1 | IP CAMERA 1-1 | TCP/IP | IP 192.168.***.11, Port 10011 | USER A | USER A |
| Func-1 | Dev-1-2 | IP CAMERA 1-2 | TCP/IP | IP 192.168.***.12, Port 10012 | USER A | USER A USER B |
| Func-2 | Dev-2-1 | IP CAMERA 2-1 | TCP/IP | IP 192.168.***.21, Port 10021 | USER A | USER A |
| .. | .. | .. | .. | .. | .. | .. |

| APPLICATION OPERATING MODULE NUMBER | APPLICATION ID | APPLICATION NAME | DEPLOYING USER | I/O DEVICE ID | I/O DEVICE NAME | OUTPUT DESTINATION |
|---|---|---|---|---|---|---|
| Func-1 | AP-1-1 | MOVING IMAGE PROCESSING | USER A | Dev-1-1 | IP CAMERA 1-1 | ip 10.*.*.20 port 10020 |
| Func-1 | AP-1-3 | MOVING IMAGE PROCESSING | USER B | Dev-1-2 | IP CAMERA 1-2 | ip 10.*.*.30 port 10030 |
| Func-2 | AP-2-1 | MOVING IMAGE PROCESSING | USER A | Dev-2-1 | IP CAMERA 2-1 | ip 10.*.*.22 port 10020 |
| .. | .. | .. | .. | .. | .. | .. |

NETWORK NODE, INFORMATION PROCESSING SYSTEM, AND METHOD

CLAIM OF PRIORITY

The present application claims priority from Japanese patent application JP2010-029898 filed on Feb. 15, 2010, the content of which is hereby incorporated by reference into this application.

BACKGROUND OF THE INVENTION

The present invention relates to permission management of multiple users who share a network node including input/output (I/O) devices such as a camera and a sensor. More particularly, the invention relates to a permission management technology for preventing permission violation when a user installs an application on the network node.

Conventionally, information technology (IT) services have been provided as integrity using individual IT devices. In accordance with the recent trend of cloud networking, there is an increasing need for the multi-tenant architecture that allows multiple IT services to use the same platform.

IT services include a monitoring service that uses an Internet Protocol (IP) camera, sensor, or any other I/O devices for acquiring real-world information. An entrance node is a potential platform for providing the monitoring service as a multi-tenant service. The entrance node includes multiple I/O devices and performs primary processing such as integrating, averaging, and summarizing input data from the I/O devices. Multiple users share the entrance node and install applications for their own primary processing on the entrance node. User-specific services operate on the entrance node. Installation of an application on the entrance node is referred to as "deployment".

When users share the entrance node, user-based permission management is required. As an example of such permission management, Japanese Patent Application Laid-Open Publication No. 2008-233947 discloses the information processing device and the information processing program for controlling an access to resources used by applications.

BRIEF SUMMARY OF THE INVENTION

The technology disclosed in Japanese Patent Application Laid-Open Publication No. 2008-233947 can assign a permitted user to each of I/O devices or applications belonging to the entrance node.

However, an assignor of the permitted user for the I/O device may differ from an assignor of the application output destination for the entrance node that accepts the application deployment from users.

Accordingly, the application output destination does not always correspond to the permitted user for the I/O device supplied with data the application processes. An application may primarily process data from the I/O device and output the processed data to users other than the permitted user of the I/O device. Deploying such application violates a permission scope.

When the application is deployed, there is a need for verifying consistency between the application output destination and the permitted user of the I/O device.

It is an object of the present invention to provide a network node, an information processing system, and a method thereof capable of addressing the above-mentioned problem and ensuring consistency between the application output destination and the permitted user of an I/O device during deployment of an application that processes and outputs input data.

To achieve the above-mentioned object, the present invention provides a network node including: a processing section for performing an application that accepts data input from one or more I/O devices, processes data input from the I/O device, and outputs data; and a storage section for storing a permission scope of the I/O device. The processing section determines whether to install the application by verifying that an output destination of the application is included in a permission scope of the I/O device for supplying data processed by the application.

To achieve the above-mentioned object, the present invention provides an information processing system including: a plurality of I/O devices; and a network node for performing an application that processes data input from the I/O device and outputs data. The network node stores permission scope data for the I/O device. The network node determines whether installation of the application can be accepted by verifying that an output destination of the application is included in a permission scope of the I/O device for supplying data processed by the application based on the stored permission scope data.

To achieve the above-mentioned object, the present invention provides an information processing method for a network node to perform an application that accepts data input from one or more I/O devices, processes data input from the I/O device, and outputs data. The method includes the steps of: storing permission scope data for the I/O device in the network node; verifying that an output destination of the application is included in a permission scope of the I/O device for supplying data processed by the application based on the stored permission scope data; and determining whether installation of the application can be accepted.

To address the above-mentioned problem, according to an aspect of the invention, the network node such as an entrance node includes a table that manages the correspondence between an application output destination and a user. A user using the network node registers information about an intended output destination to the table. The network node determines whether to accept deployment of the application from the user by verifying that the user registered as the application output destination is consistent with a user permitted for an I/O device used by the application.

According to an aspect of the invention, a permitted user for the I/O device is inherited to a permitted user for the application. It is possible to prevent data from being transmitted erratically due to incorrectly specified transmission destination of the application. The application can be integrated with an I/O device for multiple users while maintaining the high security. The same I/O device can be used to provide multiple services, making it possible to reduce costs.

BRIEF DESCRIPTION OF THE DRAWINGS

FIG. 2 exemplifies the management table for managing a list of I/O devices belonging to an entrance node according to the first embodiment;

FIG. 3 exemplifies the management table for managing a list of applications operating on an entrance node according to the first embodiment;

FIG. 4 exemplifies the management table according to the first embodiment for managing a list of output destinations of users who use an entrance node;

FIG. 11 exemplifies the management table according to the second embodiment for managing a list of applications operating on an entrance node;

FIG. 15 exemplifies the management table according to the third embodiment for managing a list of I/O devices belonging to an entrance node;

FIG. 16 exemplifies the management table according to the third embodiment for managing a list of applications operating on an entrance node;

FIG. 17 is a sequence diagram exemplifying the processing according to the third embodiment in which an entrance node manager adds an I/O device to the entrance node;

FIG. 18 is a sequence diagram exemplifying the processing according to the third embodiment in which a user deploys an application onto the entrance node;

FIG. 24 exemplifies the management table according to a seventh embodiment for managing a list of I/O devices belonging to an entrance node;

FIG. 25 exemplifies the management table according to the seventh embodiment for managing a list of applications operating on an entrance node;

FIG. 26 exemplifies the management table according to an eighth embodiment for managing a list of applications operating on an entrance node;

FIG. 27 is a sequence diagram exemplifying the processing according to the eighth embodiment in which a user device accesses an application operating in the entrance node;

FIG. 30 exemplifies the management table according to the ninth embodiment for managing a list of I/O devices belonging to an entrance node; and FIG. 31 exemplifies the management table according to the ninth embodiment for managing a list of applications operating on an entrance node.

DETAILED DESCRIPTION OF THE INVENTION

Figure 1:
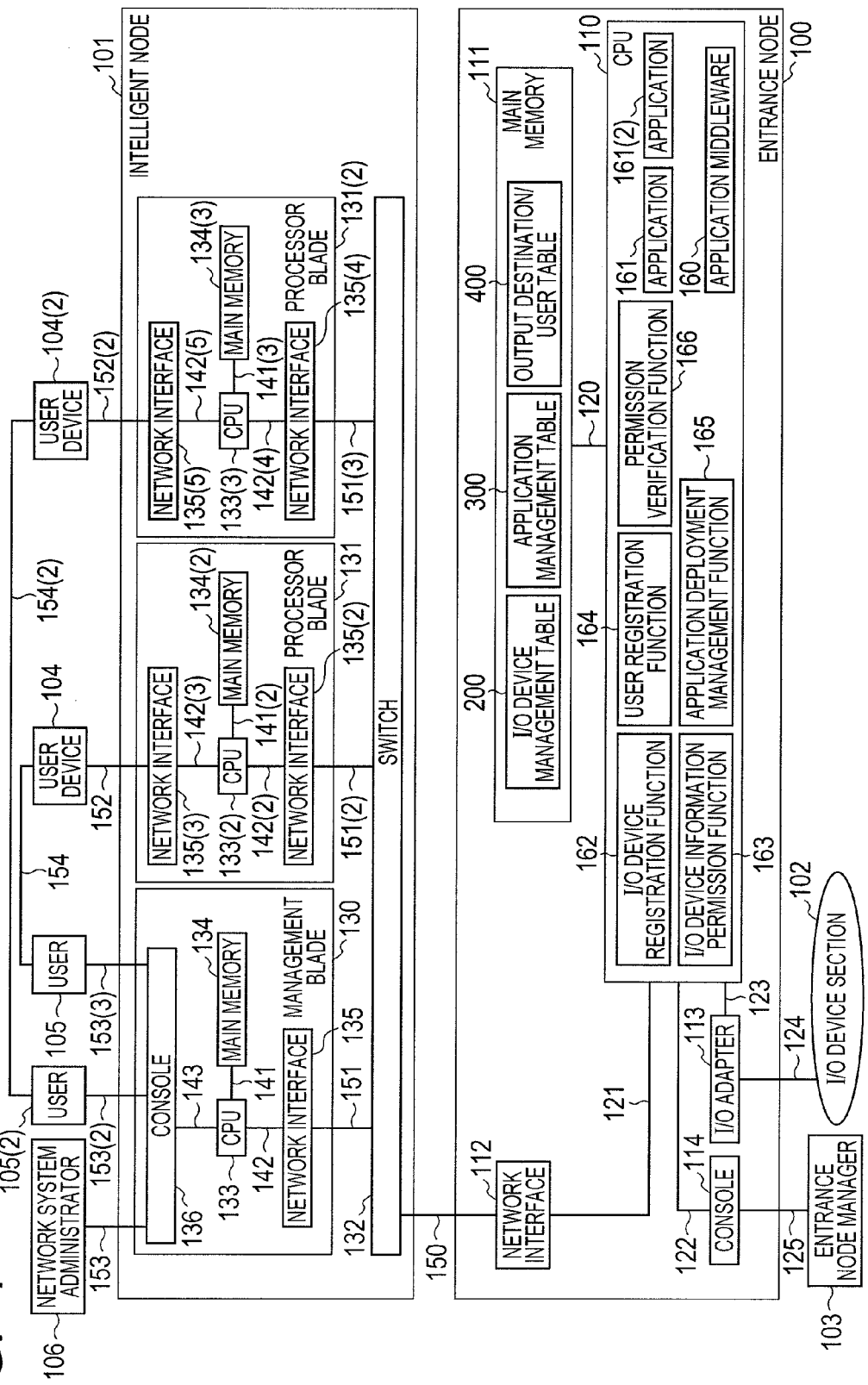
FIG. 1 exemplifies the schematic configuration of a network system according to a first embodiment.

Embodiments of the present invention will be described in further detail with reference to the accompanying drawings. Throughout the drawing, the same elements or equivalents are designated by the same reference numerals. Similar components may be distinguished by adding suffixes to the reference numerals for convenience of the description. As described above, installation of an application on the entrance node is referred to as "deployment" in this specification. It should be noted that an I/O device in this specification signifies not only a device having both input and output functions but also a device having only the input function or the output function. All or part of programs executed in a processing section of a network node may be referred to as a "section", "unit", "means", or "function".

First Embodiment

FIG. 1 is a block diagram showing the overview of a network system according to the first embodiment. The network system according to the embodiment includes an entrance node 100 as a network node and an intelligent node 101 as another network node. An I/O device section 102 having at least one I/O device and an entrance node manager 103 access the entrance node 100. A user device 104, a user 105, and a network system administrator 106 access the intelligent node 101.

The entrance node 100 includes a central processing unit (CPU) 110 as a processing section, main memory 111 as a storage section, a network interface 112 as an interface section, an input/output (I/O) section 113, and a console 114. A memory bus 120 makes a connection between the CPU 110 and the main memory 111. I/O buses 121, 122, and 123 make connections between the CPU 110 and the network interface 112, between the CPU 110 and the I/O adapter 113, and between the CPU 110 and the console 114, respectively.

An interface 124 for the I/O device connects the I/O adapter 113 with the I/O device section 102. Standards for the I/O adapter 113 and the interface 124 connected to the I/O device are not specified particularly and may include Ethernet (registered trademark), PCI (Peripheral Component Interconnect), PCI Express, USB (Universal Serial Bus), and IEEE 1394. The entrance node manager 103 directly accesses the console 114 using an input interface 125.

The intelligent node 101 includes a combination of a management blade 130, a processor blade 131, and a switch 132.

The management blade 130 includes a CPU 133, main memory 134, a network interface 135, and a console 136. A memory bus 141 makes a connection between the CPU 133 and the main memory 134. I/O buses 142 and 143 make connections between the CPU 133 and the network interface 135 and between the CPU 133 and the console 136, respectively.

The processor blade 131 includes two sets of the CPU 133, the main memory 134, and the network interface 135. The memory bus 141 makes a connection between the CPU 133 and the main memory 134. An I/O bus 142 makes a connection between the CPU 133 and the network interface 135.

A backbone network 150 makes a connection between the network interface 112 in the entrance node 100 and the switch 132 in the intelligent node 101. In the intelligent node 101, a network 151 within the node makes connections between the switch 132 and the management blade 130 and between the switch 132 and the processor blade 131. An access network 152 makes a connection between the processor blade 131 and the user device 104.

The network system administrator 106 and the user 105 directly access the console 136 in the intelligent node 101 using input interfaces 153. The user 105 accesses the user device 104 using a terminal interface 154.

The CPU 110 of the entrance node 100 executes programs such as application middleware 160, an application 161 using the middleware, an I/O device registration function 162, an I/O device information permission function 163, a user registration function 164, an application deployment management function 165, and a permission verification function 166. These programs are stored in the main memory 111 as a storage section and are loaded into the CPU 110 as needed for execution. The application middleware 160 provides a set of libraries the application 161 uses.

The main memory of the entrance node 100 further stores an I/O device management table 200, an application management table 300, and an output destination/user table 400. While the embodiment uses the above-mentioned three tables, the configuration of tables for storing management items is independent of the essence of the present invention. Another embodiment may use one or two tables to store the management items stored in the above-mentioned three tables.

The application 161 receives input from the I/O device section 102 for primary processing and transmits an output to the processor blade 131 of the intelligent node 101.

The I/O device registration function 162 registers information on the I/O device section 102 to the I/O device management table 200. For example, the I/O device registration function 162 is used when the entrance node manager 103 adds an I/O device to the I/O device section 102.

The I/O device information permission function 163 permits the registered contents of the I/O device management table 200 to the user 105, the network system administrator 106, and the entrance node manager 103.

The user registration function 164 registers data to the output destination/user table 400 for each user. The network system administrator 106 and the entrance node manager 103 use the user registration function 164 to register addresses used by users to the output destination/user table 400.

The application deployment management function 165 identifies the application deployment and updates the application management table 300. The user 105 uses the application deployment management function 165 to supply an application to the entrance node 100.

The permission verification function 166 checks for the consistency among a permitted user registered to the I/O device management table 200, the application management table 300, and an application output destination registered to the output destination/user table 400. According to the embodiment, the permission verification function 166 checks for the consistency of the application output permission when the user 105 deploys the application using the application deployment management function 165.

The following describes the configuration of the management tables belonging to the entrance node 100 in the network system according to the first embodiment.

FIG. 2 shows the I/O device management table 200. As shown in FIG. 2, the I/O device management table 200 contains an I/O device identifier (ID) column 201, an I/O device name column 202, a connection column 203, an I/O device address column 204, an owner column 205, and a permitted user column 206.

The I/O device ID column 201 contains IDs of I/O devices managed in the I/O device management table 200. The embodiment represents the IDs as Dev-1, Dev-2, and so on. The I/O device name column 202 contains I/O device names. The embodiment suffixes serial numbers to the names such as IP camera 1, IP camera 2, and so on.

The connection column 203 contains connection protocols for I/O devices. The embodiment maintains TCP/IP as information on the connection protocol. Available connection protocols for I/O devices may include PCI, PCI-Express, USB, and IEEE 1394.

The I/O device address column 204 contains I/O device addresses. The I/O device address column 204 corresponds to the connection column 203. A combination of both columns can uniquely specify an I/O device as the access destination. According to the embodiment, for example, the connection column 203 contains TCP/IP (Transmission Control Protocol/Internet Protocol) as the connection protocol. The I/O device address column 204 contains the IP address and the port number. The other connection protocols may contain appropriate addresses. For example, the PCI bus as the connection protocol is considered to contain the bus number, the device number, and the function number.

The owner column 205 contains the user who owns the I/O device. The permitted user column 206 provides a list of users 105 who are permitted to browse or use the I/O devices.

FIG. 3 shows the application management table 300. As shown in FIG. 3, the application management table 300 contains an application ID column 301, an application name column 302, a deployment user column 303, an I/O device ID column 304, an I/O device name column 305, and an output destination column 306.

The application ID column 301 contains the ID of an application managed in the application management table 300. The embodiment represents the IDs as AP-1, AP-2, and so on. The application name column 302 contains the name of the application.

The deployment user column 303 contains information about the user who deployed the application.

The I/O device ID column 304 provides a list of I/O devices the application uses. The I/O device name column 305 provides a list of names of the I/O devices referenced by the I/O device ID column 304.

The output destination column 306 contains the application output destination. The embodiment assumes the application transmission destination to be the processor blade 131 of the intelligent node 101 in accordance with TCP/IP. Therefore, the column contains the IP address and the port number.

FIG. 4 shows the output destination/user table 400. As shown in FIG. 4, the output destination/user table 400 contains a registration ID column 401, a user column 402, and an output destination column 403.

The registration ID column 401 contains IDs for combinations of output destinations and users managed in the output destination/user table. The embodiment represents the IDs as #1, #2, #3, and so on. The user column 402 contains users for combinations of output destinations and users.

The output destination column 403 contains output destinations corresponding to users in the user column 402 for combinations of output destinations and users. The output destination is not always unique. One user may use multiple output destination addresses. According to the embodiment, the column contains the IP address and the port number specific to each user.

The following describes operations of the network system according to the first embodiment.

Figure 5:
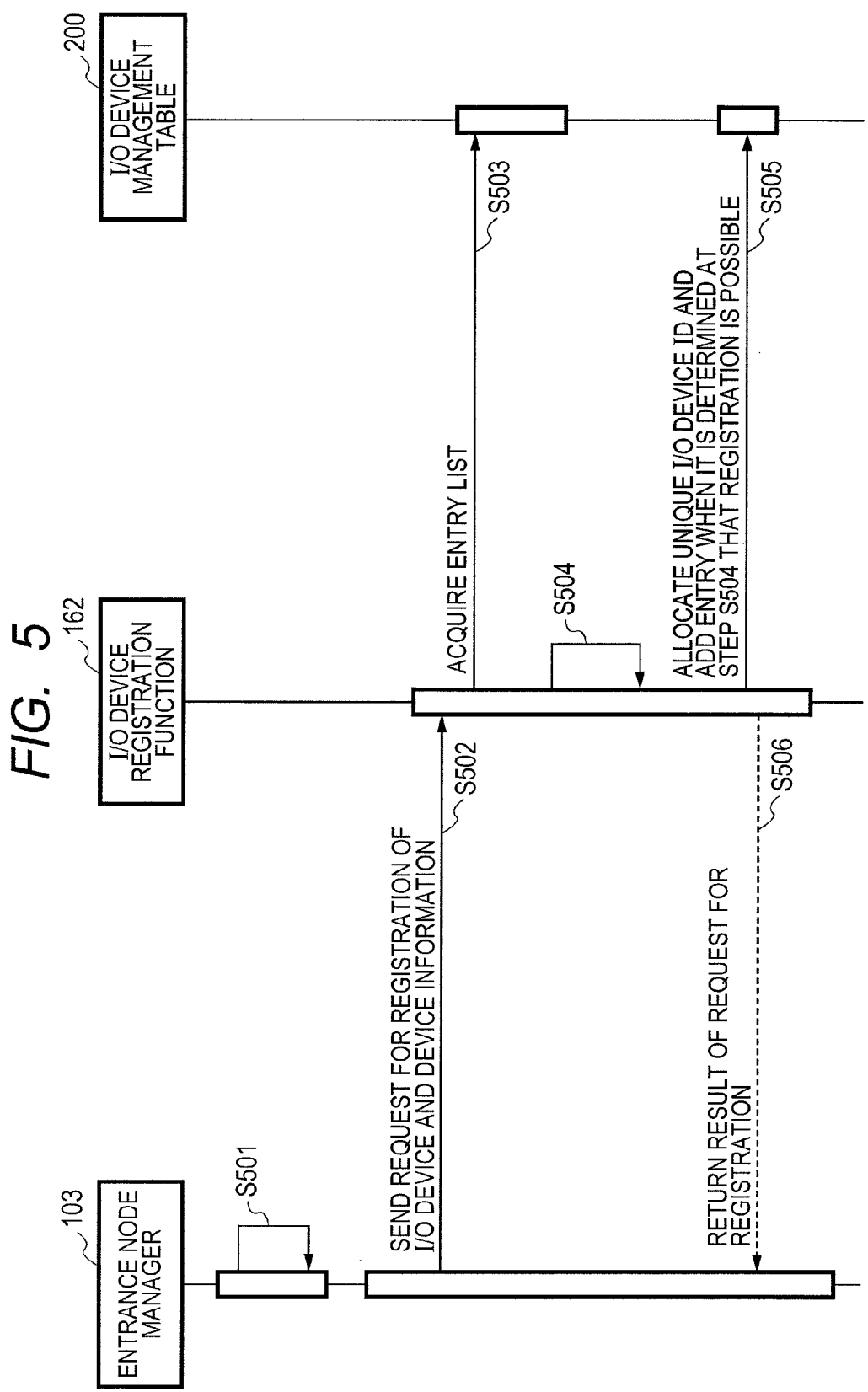
FIG. 5 is a sequence diagram exemplifying the processing according to the first embodiment in which an entrance node manager adds an I/O device to the entrance node.

FIG. 5 is a sequence diagram showing an operation during which the entrance node manager 103 adds an I/O device. As shown in FIG. 5, the operation is associated with the entrance node manager 103, the I/O device registration function 162, and the I/O device management table 200.

At step S501, the entrance node manager 103 connects an I/O device to the entrance node 100. Using the console 114, the entrance node manager 103 requests the I/O device registration function 162 to register the I/O device connected at step S501. In addition, the entrance node manager 103 supplies device information about the I/O device such as the name, connection, I/O device address, owner, and permitted user (step S502).

The I/O device registration function 162 acquires a list of entries stored in the I/O device management table 200 (step S503).

At step S504, the I/O device registration function 162 checks the entry list acquired at step S503 for an entry corresponding the I/O device requested to be registered at step S502 and determines whether the device can be registered. Specifically, the function determines that the device can be registered when the entry list does not contain an entry corresponding to the same device. The function determines that the device cannot be registered when the entry list contains an entry corresponding to the same device. This is because registering a new entry conflicts with the entry in the I/O device management table 200.

When it is determined at step S504 that the device can be registered, the I/O device registration function 162 adds an entry to the I/O device management table 200 by allocating an I/O ID not duplicate in the I/O device ID column 201 (step S505).

The I/O device registration function 162 returns the result of the registration request to the entrance node manager 103 (step S506).

Figure 6:
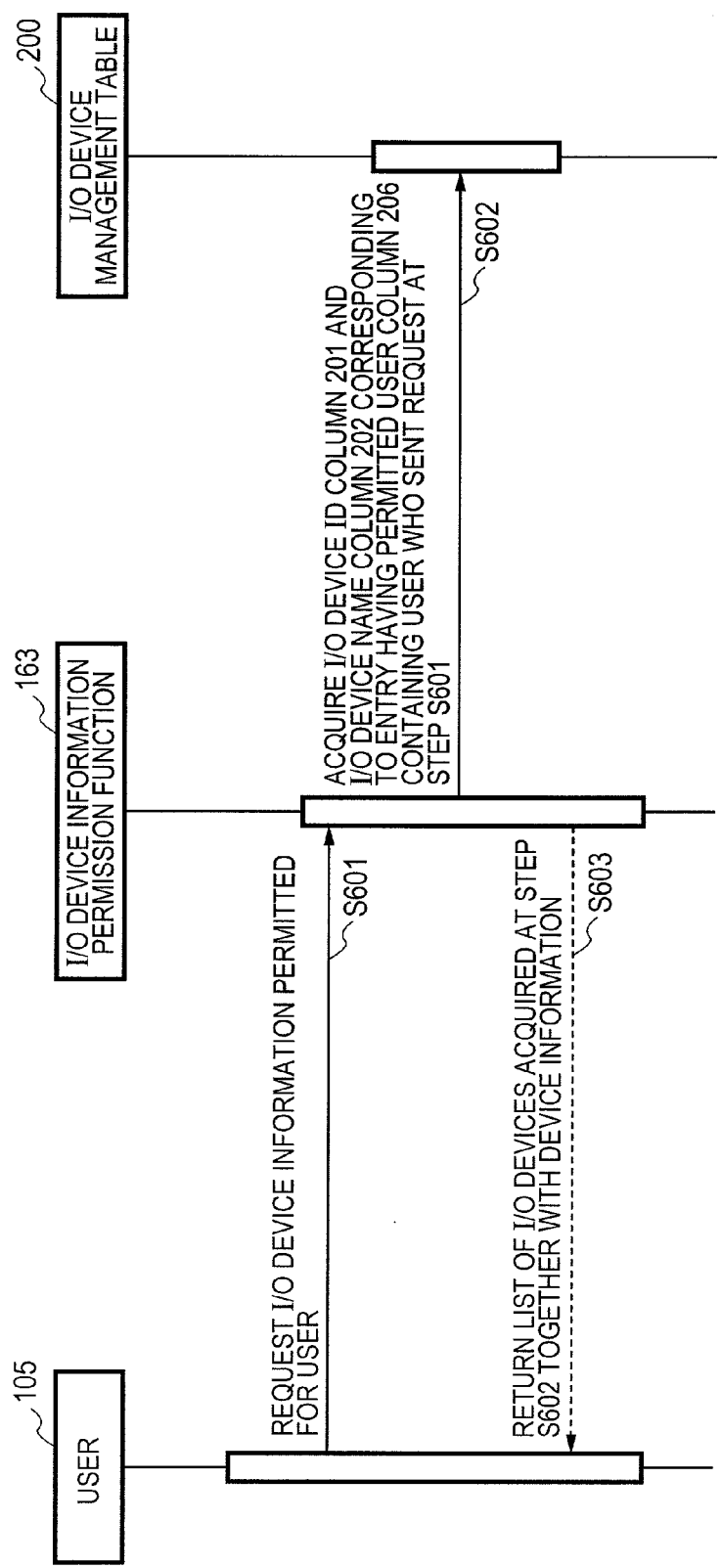
FIG. 6 is a sequence diagram exemplifying the processing according to the first embodiment in which a user acquires I/O device information on the entrance node.

FIG. 6 is a sequence diagram showing an operation during which the user 105 acquires I/O device information from the I/O device management table 200. As shown in FIG. 6, the operation is associated with the user 105, the I/O device information permission function 163, and the I/O device management table 200.

Using the console 136 of the management blade 130, the user 105 requests the I/O device information permission function 163 to send I/O device information permitted for the user 105 (step S601).

The I/O device information permission function 163 searches the permitted user column 206 in the I/O device management table 200 for an I/O device entry containing the user who sent the request at step S601. The I/O device information permission function 163 acquires the I/O device ID column 201 and the I/O device name column 202 as the device information on that entry (step S602).

The I/O device information permission function 163 returns a list of I/O devices acquired at step S602 together with the device information (I/O device ID and I/O device name) to the user 105 (step S603).

Figure 7:
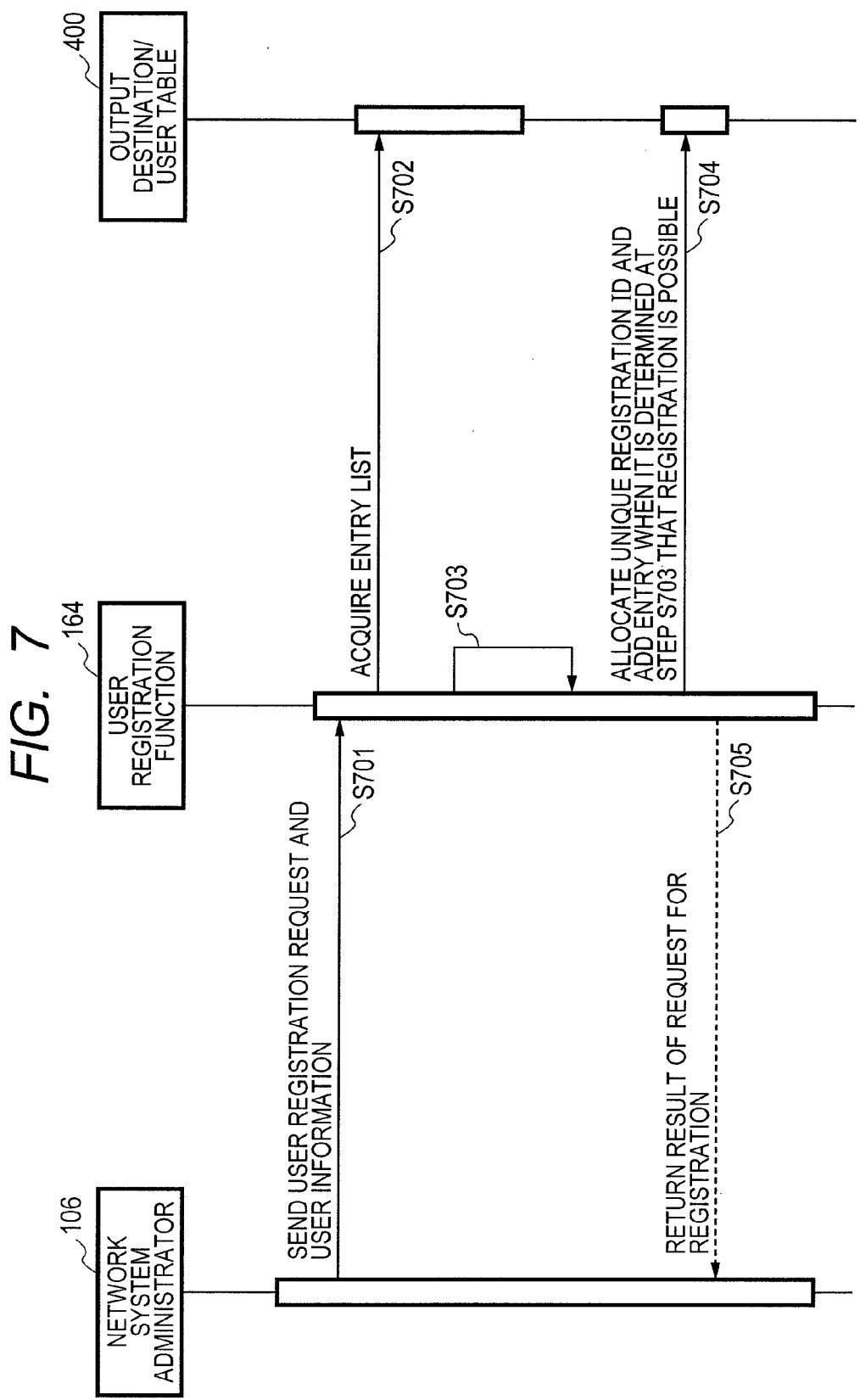
FIG. 7 is a sequence diagram exemplifying the processing according to the first embodiment in which a network system administrator registers a list of entrance node users and output destinations.

FIG. 7 is a sequence diagram showing an operation during which the network system administrator 106 registers the user 105 using the entrance node 100 and the output destination corresponding to the user to the output destination/user table 400. As shown in FIG. 7, the operation is associated with the network system administrator 106, the user registration function 164, and the output destination/user table 400.

At step S701, the network system administrator 106 requests the user registration function 164 to register a user using the console 136 of the management blade 130. In addition, the network system administrator 106 supplies the user information such as the user name and the user's available address range.

The user registration function 164 acquires a list of entries stored in the output destination/user table 400 (step S702).

At step S703, the user registration function 164 checks the entry list acquired at step S702 for an entry corresponding the user requested to be registered at step S701 and determines whether the user can be registered. Specifically, the function determines that the user can be registered when the entry list does not contain an entry corresponding to the same user. The function determines that the user cannot be registered when the entry list contains an entry corresponding to the same user. This is because registering a new entry conflicts with the existing entry.

When it is determined at step S703 that the user can be registered, the user registration function 164 adds an entry to the output destination/user table 400 by allocating a registration ID not duplicate in the registration ID column 401 (step S704).

The user registration function 164 returns the result of the registration request to the network system administrator 106 (step S705).

The information about the I/O device section 102 is registered to the I/O device management table 200. The output destination for the user 105 is registered to the output destination/user table 400. The user 105 then deploys the application onto the entrance node 100.

The application is assumed to perform a sequence of operations: acquiring input data from the specified I/O device section 102, performing primary processing in the CPU 110, and transmitting the result to the specified processor blade 131.

Figure 8:
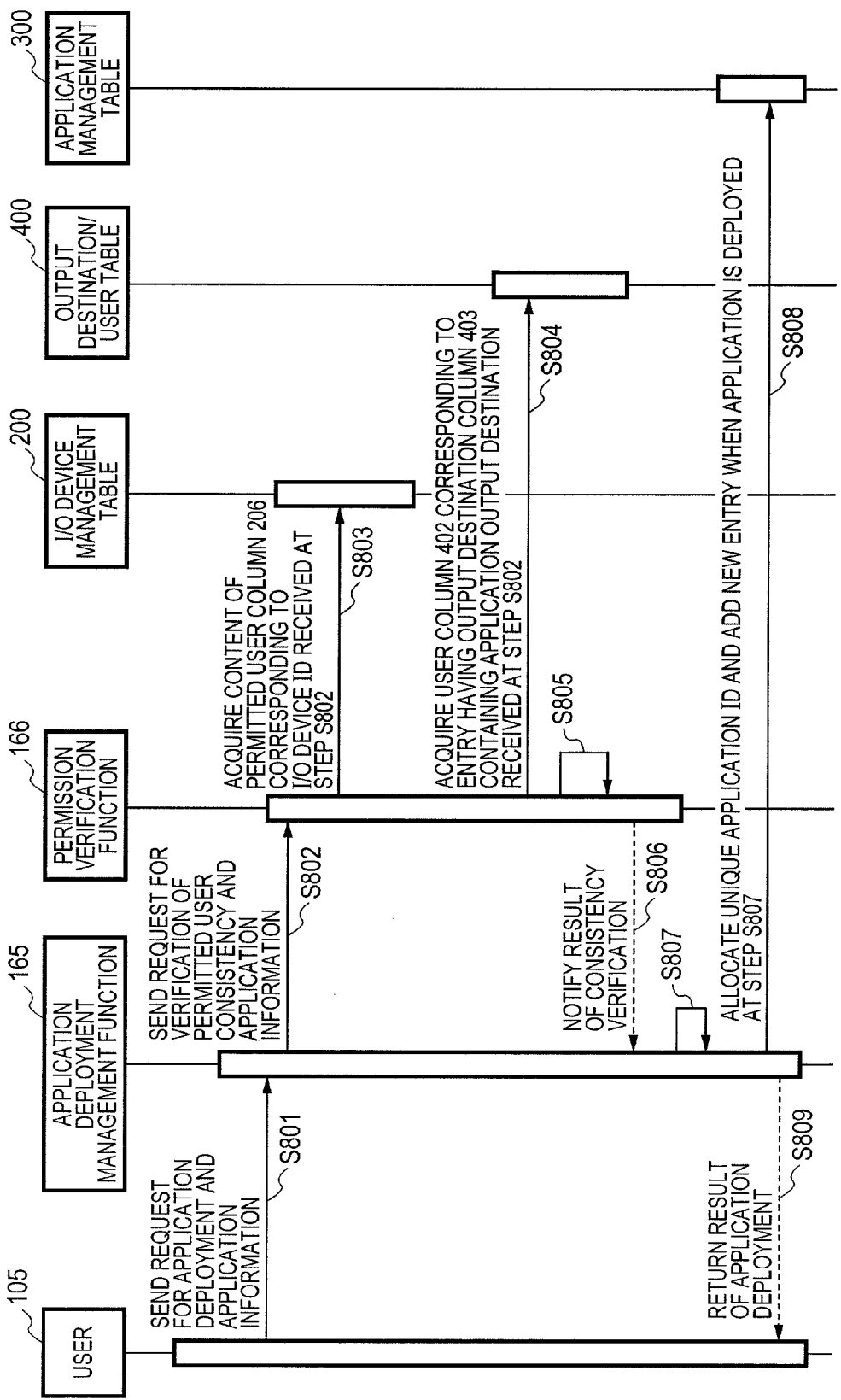
FIG. 8 is a sequence diagram exemplifying the processing according to the first embodiment in which a user deploys an application onto the entrance node.

FIG. 8 is a sequence diagram showing an operation during which the user 105 deploys an application onto the entrance node 100. As shown in FIG. 8, the operation is associated with the user 105, the application deployment management function 165, the permission verification function 166, the I/O device management table 200, the output destination/user table 400, and the application management table 300.

At step S801, the user 105 requests the application deployment management function 165 to deploy an application using the console 136 of the management blade 130. In addition, the user 105 transmits information about the application to be deployed.

At step S802, the application deployment management function 165 requests the permission verification function 166 to verify the consistency of the permitted user and sends the ID of the I/O device used by the application and the output destination of the application received at step S801.

The permission verification function 166 searches the I/O device ID column 201 in the I/O device management table 200 for an entry corresponding to the ID of the I/O device used by the application received at step S802 and acquires the content of the permitted user column 206 corresponding to the entry (step S803). The user list acquired at step S803 is equivalent to a list of permitted users for the I/O device used by the application. There may be a case where the application uses multiple I/O devices and these devices are associated with different permitted user lists. In this case, the permission verification function 166 uses all the permitted user lists by AND'ing them with each other.

The permission verification function 166 searches the output destination column 403 in the output destination/user table 400 for an entry containing the application output destination received at step S802 and acquires the content of the user column 402 for that entry (step S804). The user acquired at step S804 is equivalent to the user corresponding to the application output destination.

At step S805, the permission verification function 166 verifies the consistency between the permitted user list acquired at step S803 and the user corresponding to the application output destination acquired at step S804. The permission verification function 166 notifies the application deployment management function 165 of the result (step S806).

When the verification result at step S806 indicates the consistency, the application deployment management function 165 deploys the application at step S807. The application deployment management function 165 adds an entry to the application management table 300 by allocating an ID not duplicate in the application ID column 301 (step S808). When the verification result at step S806 indicates the inconsistency, the application deployment management function 165 does not deploy the application at step S807 and does not update the application management table 300 at step S808.

The application deployment management function 165 returns the deployment request result to the user 105 (step S809).

When the user 105 requests the application deployment, as mentioned above, the user corresponding to the application output destination is checked for consistency with reference to the permitted user list associated with the I/O device used by the application. This makes it possible to ensure that the application output destination corresponds to the permitted user associated with the I/O device.

Figure 9:
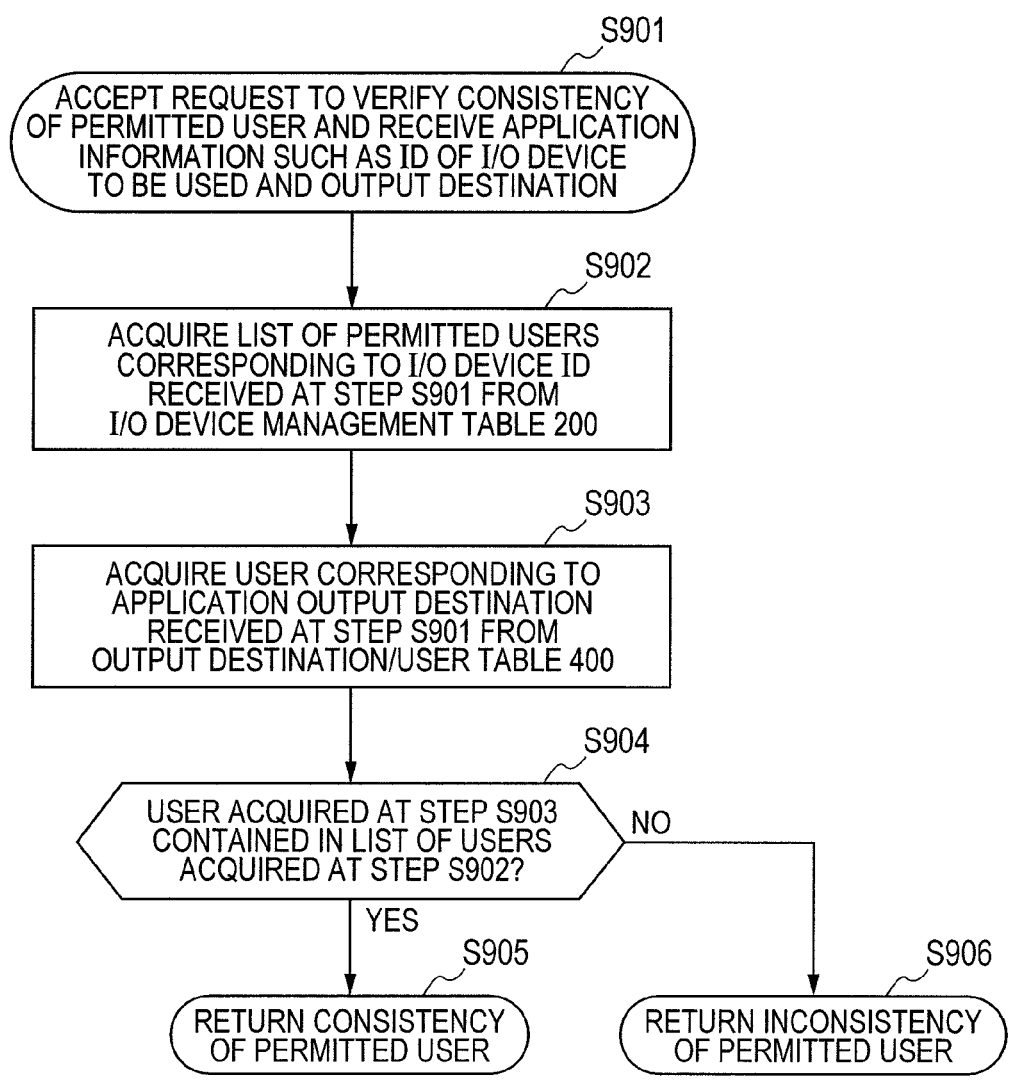
FIG. 9 is a flowchart exemplifying the processing according to the first embodiment for verifying consistency of a permitted user when he or she deploys an application onto the entrance node.

FIG. 9 is a flowchart showing the processing of the permission verification function 166 operating as a program on the CPU 110 when the entrance node 100 accepts the application deployment.

As shown at step S802 in FIG. 8, the permission verification function 166 accepts the request to verify the consistency of the permitted user. In addition, the permission verification function 166 receives the application information including the ID of the I/O device used by the application and the application output destination (step S901).

As shown at step S803 in FIG. 8, the permission verification function 166 searches the I/O device ID column 201 in the I/O device management table 200 for an entry containing the ID of the I/O device used by the application received at step S901. The permission verification function 166 acquires the content of the permitted user column 206 corresponding to the entry and generates a permitted user list (step S902).

As shown at step S804 in FIG. 8, the permission verification function 166 searches the output destination column 403 in the output destination/user table 400 for an entry containing the application output destination received at step S802. The permission verification function 166 acquires the content of the user column 402 corresponding to the entry (step S903).

As shown at step S805 in FIG. 8, the permission verification function 166 determines whether the user acquired at step S903 is contained in the user list acquired at step S902 (step S904).

When the determination at step S904 results in Yes, the user corresponding to the application output destination is consistent with the permitted user list associated with the I/O device used by the application. The permission verification function 166 returns the consistency of the permitted user (step S905). When the determination at step S904 results in No, the permission verification function 166 returns the inconsistency of the permitted user (step S906).

According to the first embodiment, the entrance node uses one network interface. When multiple users share the network system, different paths may be used for a management operation and a business operation. Users may use different paths even for a business operation so as to ensure the operation independence and improve the security.

When the network system shown in FIG. 1 uses different paths for the management and the business, there may be an approach to multiple paths between the entrance node 100 and the intelligent node 101 by logically dividing the network interface 112, the switch 132, and the backbone network 150.

The example approach will be described below. The entrance node 100 uses a VLAN (Virtual Local Area Network) so that one network interface 112 can be assumed to be virtually multiple network interfaces. Using the VLAN, one switch 132 of the intelligent node 101 can be assumed to be virtually multiple switches. The backbone network 150 equivalent to the VLAN makes a connection between the network interface 112 and the switch 132. Multiple virtual paths are provided between the network interface 112 of the entrance node 100 and the switch 132 of the intelligent node 101.

There may be available not only the virtual approach but also a physical approach to a network system that includes multiple physical network interfaces 112 and switches 132.

In order to use multiple paths, the virtual approach and the physical approach are available and both provide the same effect.

Second Embodiment

As the second embodiment, let us suppose a network system that includes multiple physical paths between the entrance node 100 and the intelligent node 101 and is capable of separating a management path from a business path.

Figure 10:
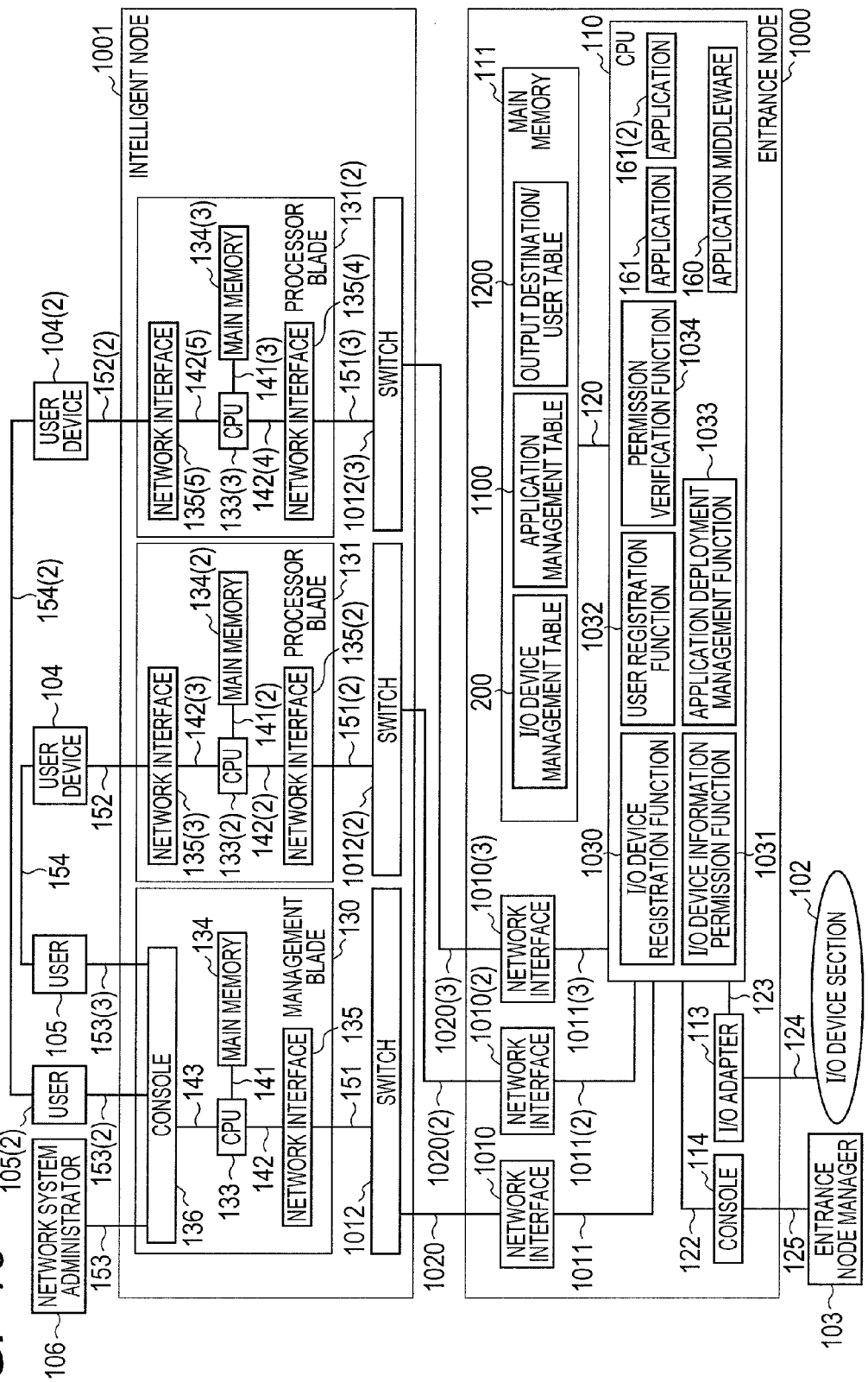
FIG. 10 exemplifies the schematic configuration of a network system according to a second embodiment.

FIG. 10 is a block diagram showing the overview of the network system according to the second embodiment.

An entrance node 1000 according to the second embodiment differs from the first embodiment as follows. The entrance node 1000 includes network interfaces 1010 corresponding to the number of blades including the management blade 130 and one or more processor blades 131 as connection destinations. An I/O bus 1011 makes a connection between the CPU 110 and the network interface 1010.

An intelligent node 1001 according to the second embodiment differs from the first embodiment as follows. The intelligent node 1001 includes switches 1012 corresponding to segments as connection destinations.

The configuration of the backbone network 1020 depends on that of the network interface 1010 or the switch 1012 as the interface. When there are multiple physical network interfaces 1010, 1010(2), 1010(3) or switches 1012, 1012(2), and 1012(3), there are also multiple physical backbone networks 1020. When the network interface 1010 or the switch 1012 is logically divided, the backbone network 1020 is also logically divided.

According to the second embodiment, the network system administrator 106 and the user 105 use different paths. Based on the used path, a permission verification function 1034 of the entrance node 1000 can not only verify the operation permission of the application but also determine whether a requester of a management operation is given the permission to perform the management operation when the management operation request is received. Specifically, an I/O device registration function 1030, an I/O device information permission function 1031, a user registration function 1032, and an application deployment management function 1033 receive a request for a management operation from the network system administrator 106 or the user 105. These functions request the permission verification function 1034 to verify the permission to perform the management operation and determine whether to accept the management operation depending on the presence or absence of the permission.

FIG. 11 shows an application management table 1100 according to the second embodiment. As shown in FIG. 11, the application management table 1100 contains an application ID column 1101, an application name column 1102, a deployment user column 1103, an I/O device ID column 1104, an I/O device name column 1105, an output destination column 1106, and a used path column 1107.

The columns 1101 through 1106 are equivalent to those in the application management table 300 according to the first embodiment. The following describes only the used path column 1107 as a difference.

The used path column 1107 contains paths used by the application for data output. The paths extend to the network interface 1010 in the entrance node 1000, the backbone network 1020, and the switch 1012 in the intelligent node 1001. According to the embodiment, the naming convention represents the used path column 1107 as business path-1, business path-2, and so on.

Figure 12:
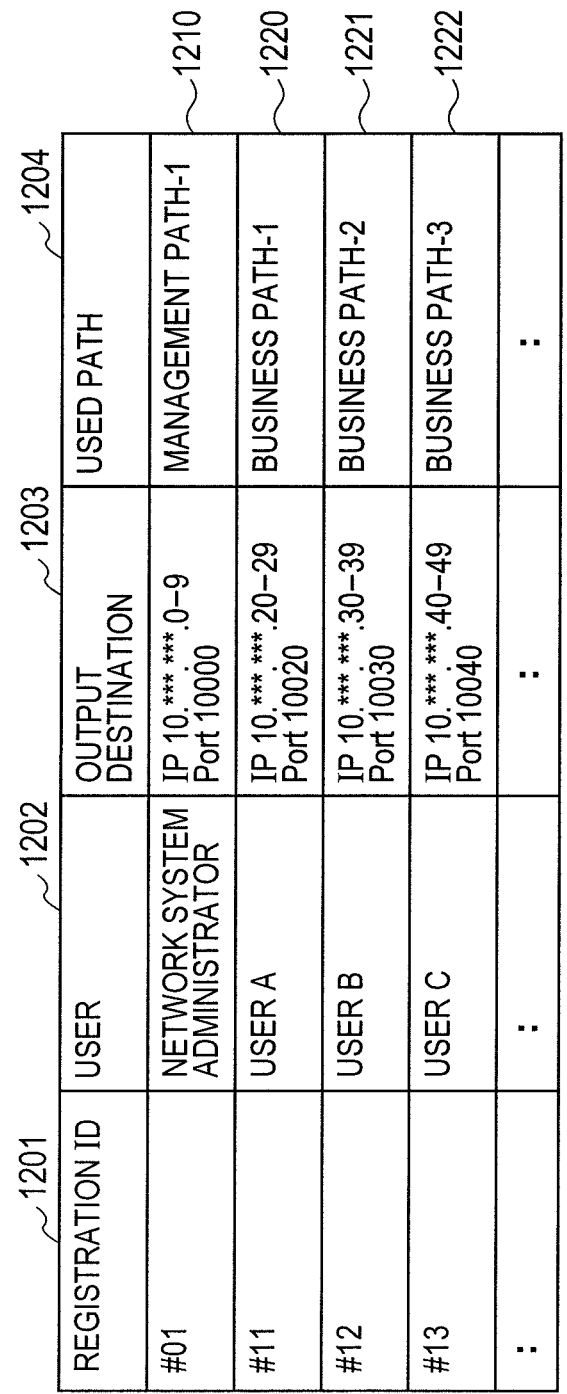
FIG. 12 exemplifies the management table according to the second embodiment for managing a list of output destinations of users who use an entrance node.

FIG. 12 shows an output destination/user table 1200 according to the second embodiment. As shown in FIG. 12, the output destination/user table 1200 contains a registration ID column 1201, a user column 1202, an output destination column 1203, and a used path column 1204.

The columns 1201 through 1203 are equivalent to those in the output destination/user table 400 according to the first embodiment. The following describes only the used path column 1204 as a difference.

The used path column 1204 contains paths used by the network system administrator 106 and the user 105. A combination of the user 105 and the used path depends on the policy. When the security is considered to be important, a unique business path is allocated to each of users 105 corresponding to entries 1220 through 1222 for preventing interference from the other users during communication.

The output destination/user table 1200 according to the second embodiment contains not only the entries 1220 through 1222 for business paths used by the users 105 but also an entry 1210 for a management path used by the network system administrator 106.

By referencing the output destination/user table 1200, the permission verification function 1034 according to the second embodiment can determine whether a management requester is contained in the management path.

Figure 13:
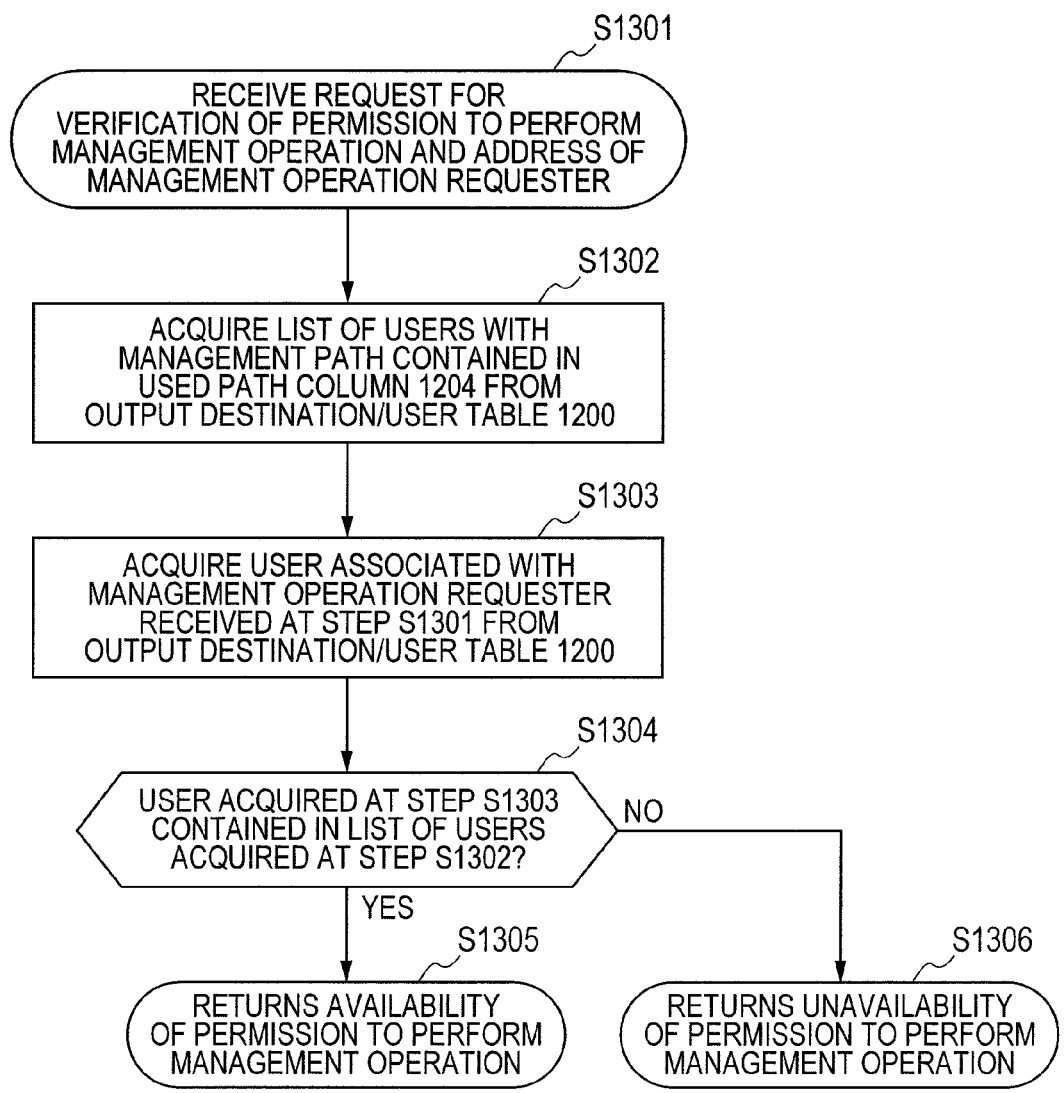
FIG. 13 is a flowchart exemplifying the processing according to the second embodiment for confirming availability of the management permission when a network system administrator requests a management operation from the entrance node.

FIG. 13 is a flowchart showing an operation in which the permission verification function 1034 checks the permission of a management operation requester.

The I/O device registration function 1030, the I/O device information permission function 1031, the user registration function 1032, and the application deployment management function 1033 receive a request for management operation from the network system administrator 106. These functions then request the permission verification function 1034 to verify the management permission, and notify the address of the management operation requester (step S1301).

The permission verification function 1034 searches the used path column 1204 of the output destination/user table 1200 for an entry containing the management path provided with the management operation permission and acquires the user column 1202 corresponding to the entry (step S1302).

From the output destination/user table 1200, the permission verification function 1034 acquires a user corresponding to the management operation requester address that is received at step S1301 and is contained in the output destination column 1203 (step S1303).

The permission verification function 1034 determines whether the user corresponding to the management operation requester acquired at step S1303 is contained in a list of users corresponding to the management path acquired at step S1302 (step S1304).

When the determination at step S1304 results in Yes, the permission verification function 1034 returns availability of the permission to perform the management operation (step S1305). When the determination at step S1304 results in No, the permission verification function 1034 returns unavailability of the permission to perform the management operation (step S1306).

The embodiment assumes that only the network system administrator is provided with the management permission. According to a possible embodiment, the user 105 may be provided with part of the management permission and send a management request to the functions 1030 through 1034. The permission may be then verified similarly to the above-mentioned sequence.

According to the second embodiment, the communication contents for users do not interfere with each other when different paths are allocated to the users 105. The embodiment can use a DHCP server and a DNS server to configure a domain name and an IP address for each path and automatically allocate IP addresses. This makes it possible to eliminate the need for configuring or resolving IP addresses and simplify steps of verifying the consistency of an output destination.

Third Embodiment

Let us consider the third embodiment that uses a DHCP server and a DNS server to automatically configure or resolve an IP address.

Figure 14:
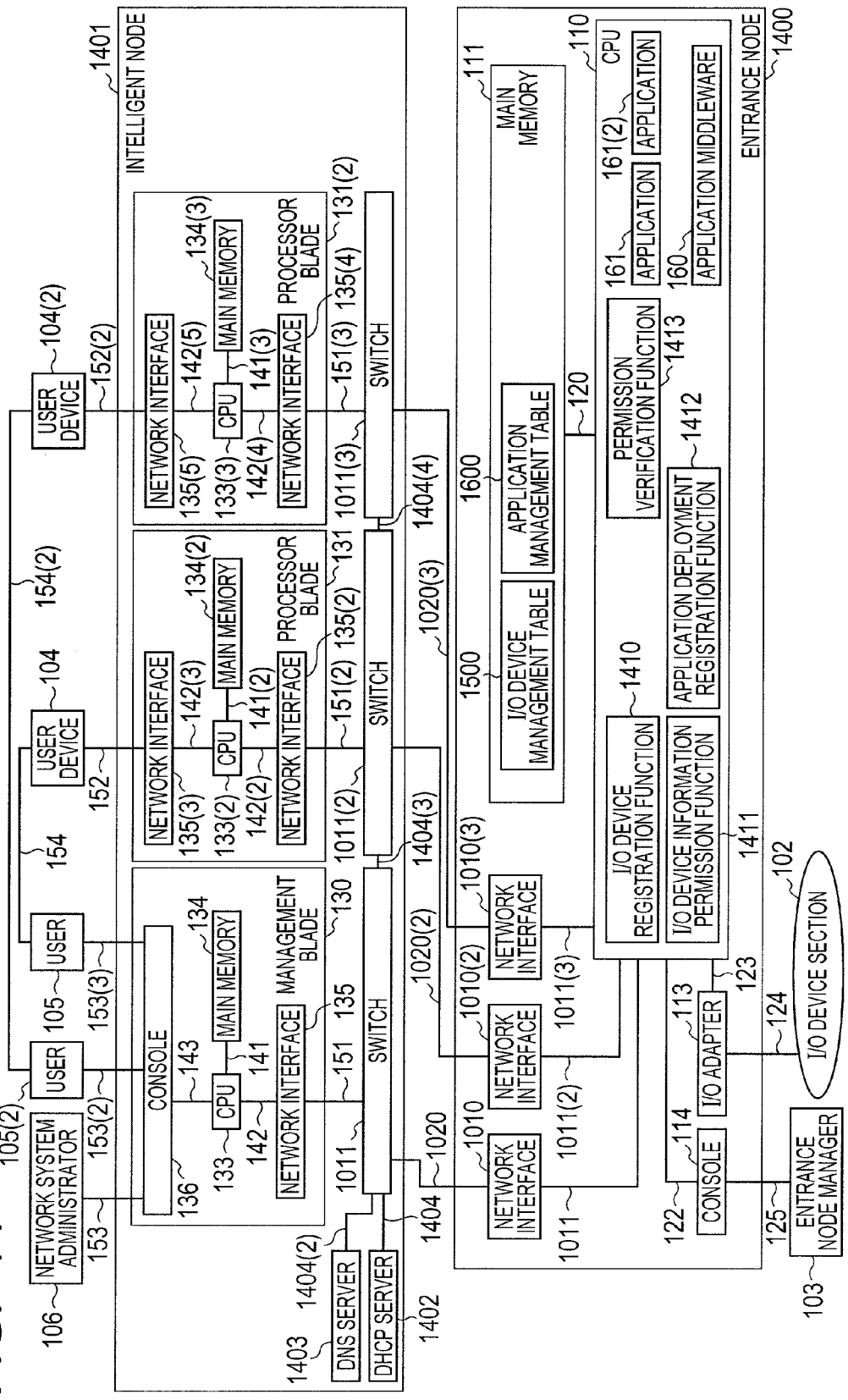
FIG. 14 exemplifies the schematic configuration of a network system according to a third embodiment.

FIG. 14 is a block diagram showing an overview of the network system according to the third embodiment. The following describes a difference from the second embodiment.

An intelligent node 1401 includes a DHCP server 1402 and a DNS server 1403. These servers configure an IP address or resolve a host name on the paths the network system administrator 106 and the user 105 use.

One DHCP server 1402 and one DNS server 1403 may be provided for each path. If a switch 1011 has the relay function, one DHCP server 1402 and one DNS server 1403 can be used for multiple paths. In FIG. 14, the relay function is applied to the switch. Reference numeral 1404 represents relay connection. The configuration in FIG. 14 shows just an example. The DHCP serve 1402 and the DNS server 1403 are not necessarily included in the intelligent node 1401 and may be available on the network connected to the intelligent node 1401.

A change in the configuration affects an I/O device registration function 1410, an I/O device information permission function 1411, an application deployment registration function 1412, and a permission verification function 1413, and the contents of an I/O device management table 1500 and an application management table 1600 in an entrance node 1400.

FIG. 15 shows the I/O device management table 1500 according to the third embodiment. As shown in FIG. 15, the I/O device management table 1500 contains an I/O device ID column 1501, an I/O device name column 1502, a connection column 1503, an I/O device address 1504, an owner column 1505, a permitted user column 1506, and a permitted output destination user column 1507.

The columns 1501 through 1506 are equivalent to those in the I/O device management table 200 according to the first embodiment. Only the permitted output destination user column 1507 will be described as a difference. The permitted output destination user column 1507 stores a domain available for the user registered to the permitted user column 1506.

FIG. 16 shows the application management table 1600 according to the third embodiment. As shown in FIG. 16, the application management table 1600 contains an application ID column 1601, an application name column 1602, a deploying user column 1603, an I/O device ID column 1604, an I/O device name column 1605, an output destination column 1606, and an output destination user column 1607.

The columns 1601 through 1605 are equivalent to those in the application management table 300 according to the first embodiment. Only the output destination column 1606 and the output destination user column 1607 will be described as a difference.

The output destination column 1606 contains an IP address and a port number as the output destination of the application. The IP address is represented by a host name and a domain name. The output destination user column 1607 stores the user corresponding to the output destination column 1606.

As seen from the I/O device management table 1500 and the application management table 1600, the third embodiment uses the DHCP server 1402 and the DNS server 1403 to allocate an available domain and its segment to each user. Specifying a user can determine the corresponding permitted user. It is possible to establish a correspondence between the IP address of the output destination and the user without the need for registration to the output destination/user table as practiced in the first embodiment.

FIG. 17 is a sequence diagram showing an operation during which the entrance node manager 103 adds an I/O device. As shown in FIG. 17, the operation is associated with an entrance node manager 103, an I/O device registration function 1410, and an I/O device management table 1500.

At step S1701, the entrance node manager 103 connects an I/O device to the entrance node.

Using the console 114, the entrance node manager 103 requests the I/O device registration function 1410 to register the I/O device connected at step S1701. In addition, the entrance node manager 103 notifies I/O device information including the name, connection, I/O device address, owner, permitted user, domain name of the permitted user (step S1702).

The I/O device registration function 1410 acquires a list of entries stored in the I/O device management table 1500 (step S1703).

At step S1704, the I/O device registration function 1410 checks if the entry list acquired at step S1703 contains an entry the information about the I/O device requested for the registration at step S1702 in order to determine whether the I/O device can be registered. Specifically, the function determines that the device can be registered when the entry list does not contain an entry corresponding to the same device. The function determines that the device cannot be registered when the entry list contains an entry corresponding to the same device. This is because registering a new entry conflicts with the entry in the I/O device management table 1500.

When it is determined at step S1704 that the device can be registered, the I/O device registration function 1410 adds an entry to the I/O device management table 1500 by allocating an I/O ID not duplicate in the I/O device ID column 1501 (step S1705).

The I/O device registration function 1410 returns the result of the registration request to the entrance node manager 103 (step S1706).

According to the third embodiment, the operation of the user 105 to acquire information about the I/O device 102 for the entrance node 1400 is equivalent to the sequence shown in FIG. 6 according to the first embodiment.

FIG. 18 is a sequence diagram showing an operation according to the third embodiment during which the user 105 deploys an application onto the entrance node 1400. As shown in FIG. 18, the operation is associated with the user 105, an application deployment management function 1412, an permission verification function 1413, an I/O device management table 1500, and an application management table 1600.

Using the console 136 of the management blade 130, the user 105 requests the application deployment management function 1412 to deploy an application. In addition, the user 105 sends application information about the application to be deployed. The application information includes the ID of the I/O device used by the application and the application output destination. According to the embodiment, the application output destination is represented by the host name and the domain name, not the IP address (step S1801).

The application deployment management function 1412 requests the permission verification function 1413 to verify the consistency of the permitted user and sends the ID of the I/O device used by the application and the output destination of the application received at step S1801 (step S1802).

The permission verification function 1413 searches the I/O device ID column 1501 in the I/O device management table 1500 for an entry corresponding to the ID of the I/O device used by the application received at step S1802 and acquires the content of the domain name column 1507 for the permitted user corresponding to the entry (step S1803). The domain name list acquired in this sequence is equivalent to a list of permission scopes for the I/O device used by the application. There may be a case where the application uses multiple I/O devices and these devices are associated with different permitted domain name lists. In this case, the permission verification function 1413 uses all the permitted domain name lists by AND'ing them with each other.

At step S1804, the permission verification function 1413 verifies consistency between the domain name list for the permitted user acquired at step S1803 and the application output destination acquired at step S1802. The permission verification function 1413 then notifies the result to the application deployment management function 1412 (step S1805).

The subsequent steps S1806 through S1808 are equal to steps S807 through S809 for the application deployment sequence according to the first embodiment.

The permission verification function 1413 according to the third embodiment can determine the user corresponding to the output destination by resolving the domain name. The consistency of the permitted user can be verified only through the use of the information stored in the I/O device management table 1500.

Figure 19:
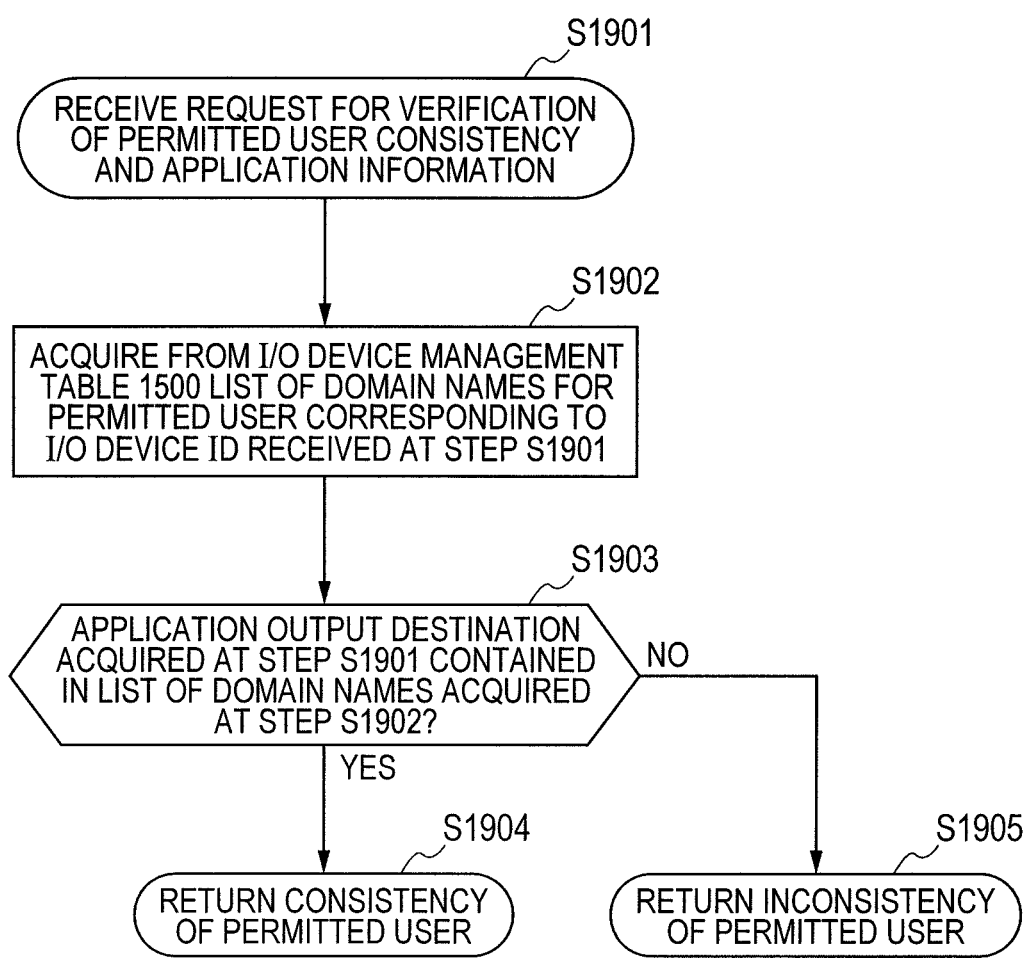
FIG. 19 is a flowchart exemplifying the processing according to the third embodiment for verifying consistency of a permitted user when he or she deploys an application onto the entrance node.

FIG. 19 is a flowchart showing an operation of the permission verification function 1413 according to the third embodiment.

As shown at step S1802 in FIG. 18, the permission verification function 1413 receives the request for verification of the permitted user's consistency and the application information including the ID of the I/O device used by the application and the output destination of the application (step S1901). According to the third embodiment, the application output destination is represented by the host name and the domain name.

As shown at step S1803 in FIG. 18, the permission verification function 1413 searches the I/O device ID column 1501 of the I/O device management table 1500 for an entry containing an I/O device ID used by the application received at step S1901. The permission verification function 1413 acquires the content of the domain name column 1507 corresponding to the permitted user contained in the entry and generates a permitted user domain name list (step S1902).

As shown at step S1804 in FIG. 18, the permission verification function 1413 determines whether the domain name for the application output destination received at step S1901 is contained in the domain name list acquired at step S1902 for the permitted user corresponding to the I/O device used by the application (step S1903).

When the determination at step S1903 results in Yes the user corresponding to the application output destination is consistent with the permitted user list associated with the I/O device used by the application. The permission verification function 1413 returns the consistency of the permitted user (step S1904). When the determination at step S1903 results in No, the permission verification function 1413 returns the inconsistency of the permitted user (step S1905).

Fourth Embodiment

The fourth embodiment will be described. According to the first embodiment, the application deployment management function 165 rejects the deployment when an output user for the application is inconsistent with the permitted user for the I/O device used by the application. The fourth embodiment restricts output users for the application, ensures the consistency between an output user and the permitted user for the I/O device used by the application, and deploys the application.

The fourth embodiment uses the same physical configuration as that of the first embodiment and differs from the first embodiment only in operations. The following describes only differences from the first embodiment and omits the same description as the first embodiment.

Figure 20:
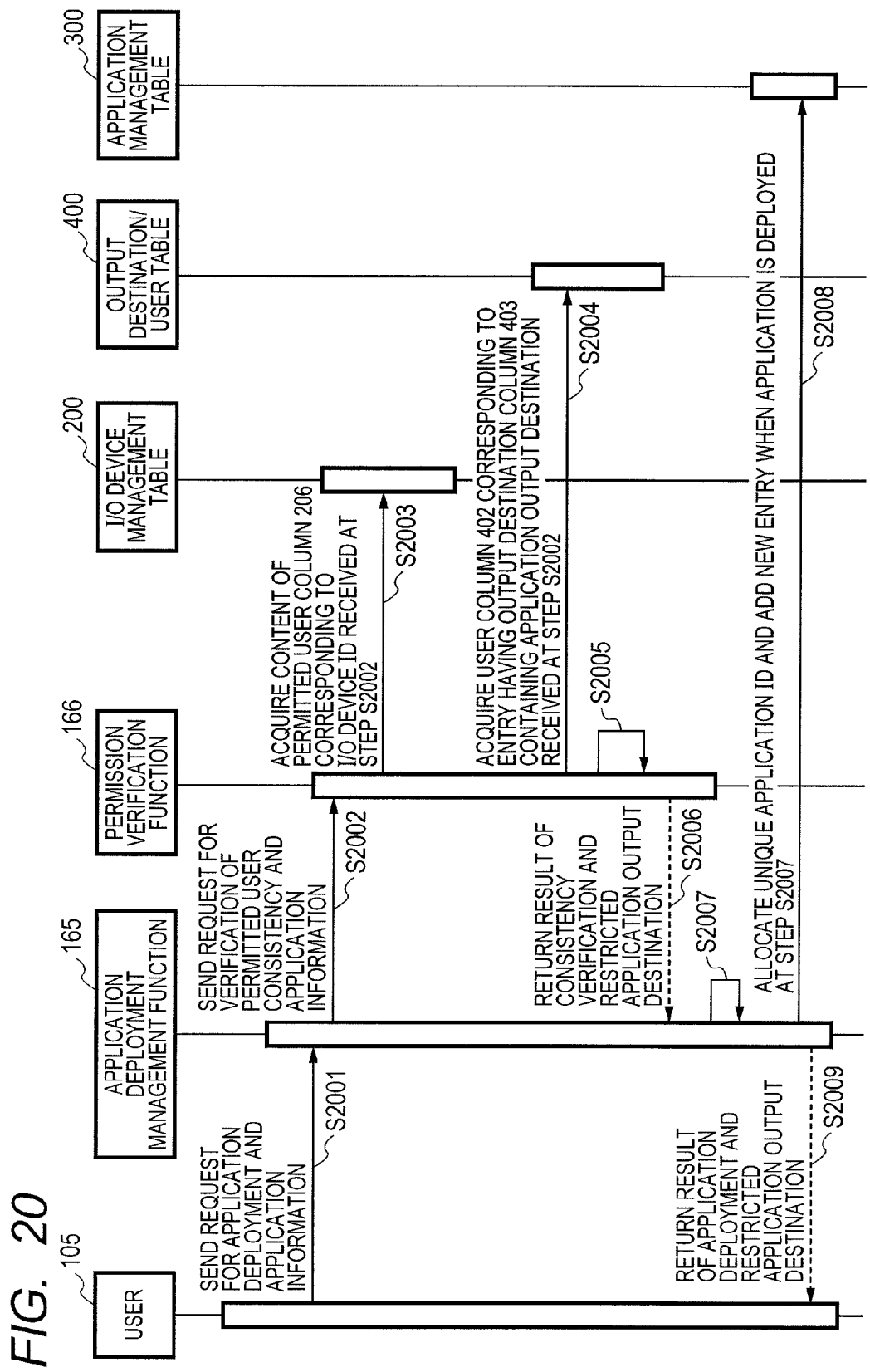
FIG. 20 is a sequence diagram exemplifying the processing according to a fourth embodiment in which a user deploys an application onto the entrance node.

FIG. 20 is a sequence diagram showing an operation according to the fourth embodiment during which the user 105 requests the deployment. As shown in FIG. 20, the operation is associated with the user 105, the management blade 130, the application deployment management function 165, the permission verification function 166, the I/O device management table 200, the output destination/user table 400, and the application management table 300.

Steps S2001 through S2004 in this sequence are equal to steps S801 through S804 of the application deployment according to the first embodiment. At step S2003, the permission verification function 166 acquires the permitted user list corresponding to the I/O device used by the application. At step S2004, the permission verification function 166 acquires the user corresponding to the output destination for the application.

At step S2005, the permission verification function 166 verifies the consistency between the permitted user lists acquired at step S2003 and the user corresponding to the application output destination acquired at step S2004. When the inconsistency is found, the permission verification function 166 restricts output destinations for the application acquired at step S2002 so as to ensure the consistency. When there is no consistency between the permitted user list acquired at step S2003 and the user corresponding to the application output destination acquired at step S2004, the permission verification function 166 determines that no consistency is available despite the restriction on output destinations for the application (step S2005).

The permission verification function 166 returns the consistency result and the restricted application output destination to the application deployment management function 165. When it is determined at step S2005 that no consistency is available despite the restriction on output destinations for the application, the permission verification function 166 notifies that the inconsistency is found and the output destination is uncorrectable (step S2006).

The application deployment management function 165 deploys the application when the consistency is received as a verification result at step S2006 (step S2007). The application deployment management function 165 adds an entry to the application management table 300 by allocating an ID not duplicate in the application ID column 301 (step S2008). When notified of the inconsistency as a verification result and the restricted output destination at step S2006, the application deployment management function 165 deploys the application in accordance with the received restricted output destination (step S2007). The application deployment management function 165 adds an entry to the application management table 300 by allocating an ID not duplicate in the application ID column 301 (step S2008). When notified of the inconsistency as a verification result and the uncorrectable output destination received at step S2006, the application deployment management function 165 does not deploy the application at step S2007 and does not update the application management table 300 at step S2008.

The application deployment management function 165 returns the result of request for the deployment to the user 105 (step S2009).

Figure 21:
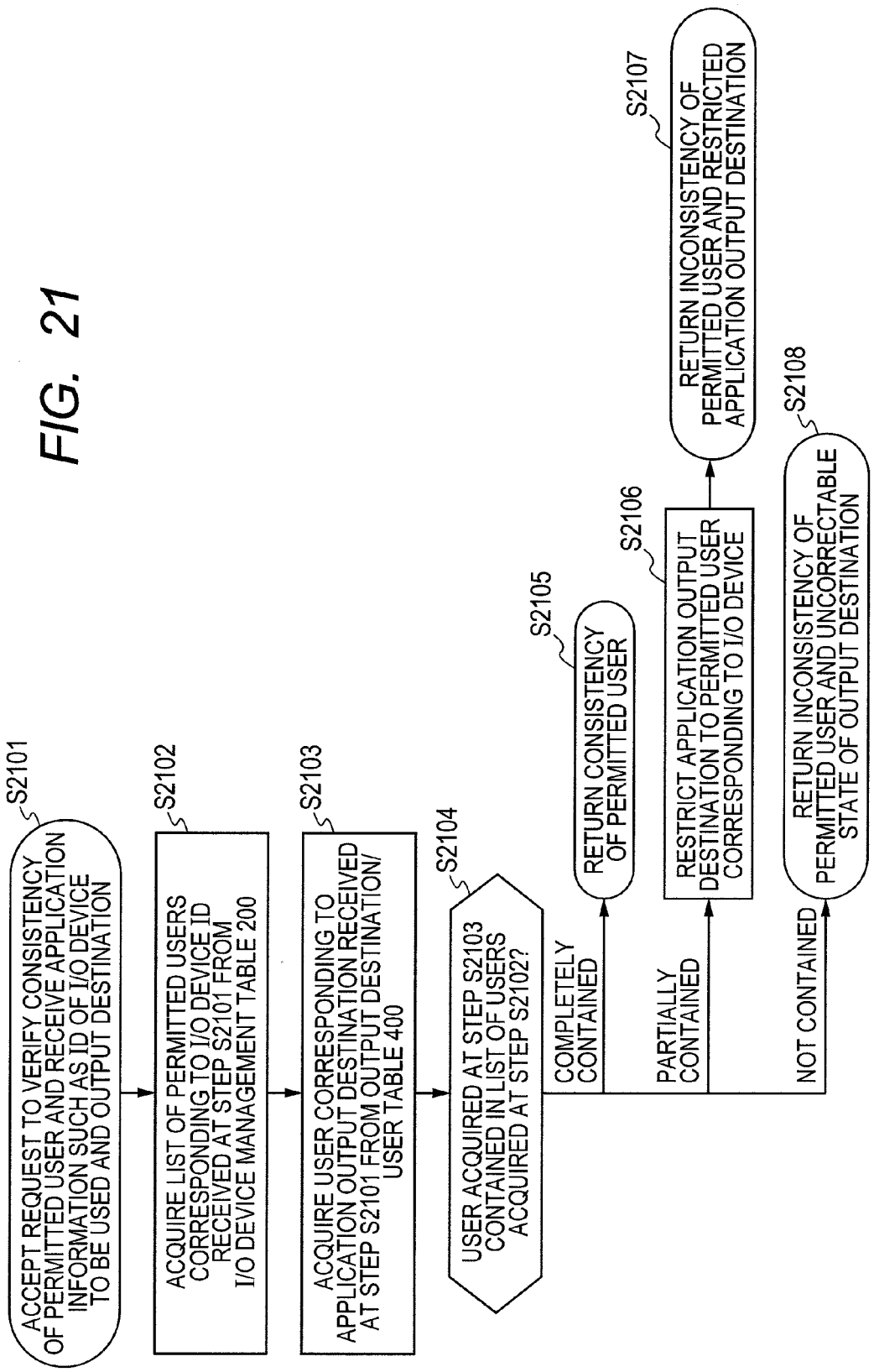
FIG. 21 is a flowchart exemplifying the processing according to the fourth embodiment for verifying consistency of a permitted user when he or she deploys an application onto the entrance node.

FIG. 21 is a flowchart showing an operation of the permission verification function 166 during the application deployment according to the fourth embodiment.

As shown at step S2002 in FIG. 20, the permission verification function 166 receives a request for verification of the permitted user's consistency and application information including the ID of the I/O device used by the application and the output destination of the application (step S2101).

As shown at step S2003 in FIG. 20, the permission verification function 166 searches the I/O device ID column 201 of the I/O device management table 200 for an entry containing an I/O device ID used by the application received at step S2101. The permission verification function 166 acquires the content of the permitted user column 206 corresponding to the entry and generates a permitted user list (step S2102).

As shown at step S2004 in FIG. 20, the permission verification function 166 searches the output destination column 403 in the output destination/user table 400 for an entry containing the application output destination received at step S2101. The permission verification function 166 acquires the content of the user column 402 corresponding to the entry (step S2103).

As shown at step S2005 in FIG. 20, the permission verification function 166 determines whether the user acquired at step S2103 is contained in the user list acquired at step S2102 (step S2104). When the result at step S2104 indicates the complete inclusive relation, the user corresponding to the application output destination is consistent with the permitted user list for the I/O device used by the application. The permission verification function 166 returns the consistency of the permitted user (step S2105). When the result at step S2104 indicates the partially inclusive relation, the permission verification function 166 restricts the application output destination received at step S2101 only to relevant permitted users (step S2106). The permission verification function 166 returns the inconsistency of permitted users and the restricted application output destination (step S2107). When the result at step S2104 indicates no inclusive relation, the permission verification function 166 returns the inconsistency of permitted users and the uncorrectable state of the output destination (step S2108).

Fifth Embodiment

The fifth embodiment will be described. According to the first embodiment, the application deployment management function 165 accepts the application deployment. In this case, the permission verification function 166 verifies the consistency of the permitted user for the application. According to the fifth embodiment, the deployed and active application requests to verify the consistency of the permitted user and determines whether to perform external output.

The fifth embodiment uses the same physical configuration as that of the first embodiment and differs from the first embodiment only in operations. The following describes only differences from the first embodiment and omits the same description as the first embodiment.

Figure 22:
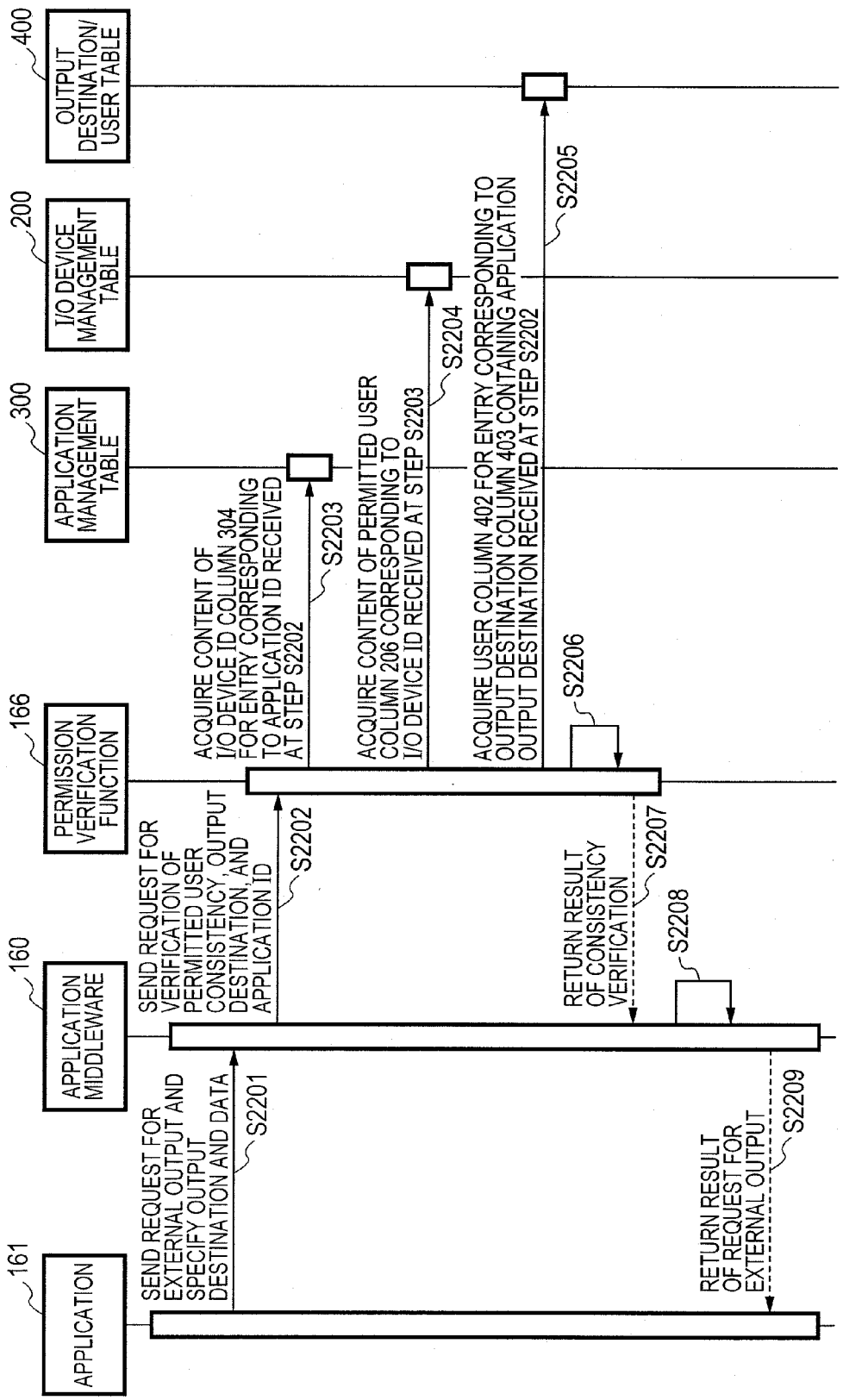
FIG. 22 is a sequence diagram exemplifying the processing according to a fifth embodiment in which an application requests data output.

FIG. 22 is a sequence diagram showing an operation according to the fifth embodiment during which the application 161 attempts external output. As shown in FIG. 22, the operation is associated with the application 161, the application middleware 160, the permission verification function 166, the application management table 300, the I/O device management table 200, and the output destination/user table 400.

When attempting external output, the application 161 requests the application middleware 160 to perform external transmission and specifies the output destination and data (step S2201).

The application middleware 160 requests the permission verification function 166 to verify the consistency of the permitted user. In addition, the application middleware 160 transmits the output destination specified at step S2201 and the ID of the application that issued the request at step S2201 (step S2202).

The permission verification function 166 searches the application ID column 301 in the application management table 300 for an entry corresponding to the application ID acquired at step S2202 and acquires the content of the I/O device ID column 304 for the entry (step S2203).

The permission verification function 166 searches the I/O device ID column 201 in the I/O device management table 200 for an entry corresponding to the I/O device ID acquired at step S2203 and acquires the content of the permitted user column 206 for the entry (step S2204).

The permission verification function 166 searches the output destination column 403 in the output destination/user table 400 for an entry containing the application output destination received at step S2202 and acquires the content of the user column 402 for the entry (step S2205).

At step S2206, the permission verification function 166 verifies the consistency between the permitted user list for the I/O device acquired at step S2204 and a list of users corresponding to the output destination acquired at step S2205. Specifically, the permission verification function 166 performs the evaluation equivalent at step S904 of the flowchart in FIG. 9 similarly to the verification of the permitted user's consistency according to the first embodiment.

The permission verification function 166 returns the result of the consistency verification to the application middleware 160 (step S2207).

When the result at step S2207 is successful, the application middleware 160 performs external output at step S2208. When the result at step S2207 is unsuccessful, the application middleware 160 stops external output.

The application middleware 160 returns an external output result to the application 161 (step S2209).

The fifth embodiment can verify the consistency of the permitted user even after the application is deployed and is operating. The first embodiment is unavailable if an application output destination cannot be acquired during the application deployment. In such a case, the fifth embodiment is useful.

Sixth Embodiment

The sixth embodiment will be described. According to the sixth embodiment, the entrance node manager 103 changes the permitted user of an I/O device used by the application 161.

The sixth embodiment uses the same physical configuration as that of the first embodiment and differs from the first embodiment only in operations. The following describes only differences from the first embodiment and omits the same description as the first embodiment.

Figure 23:
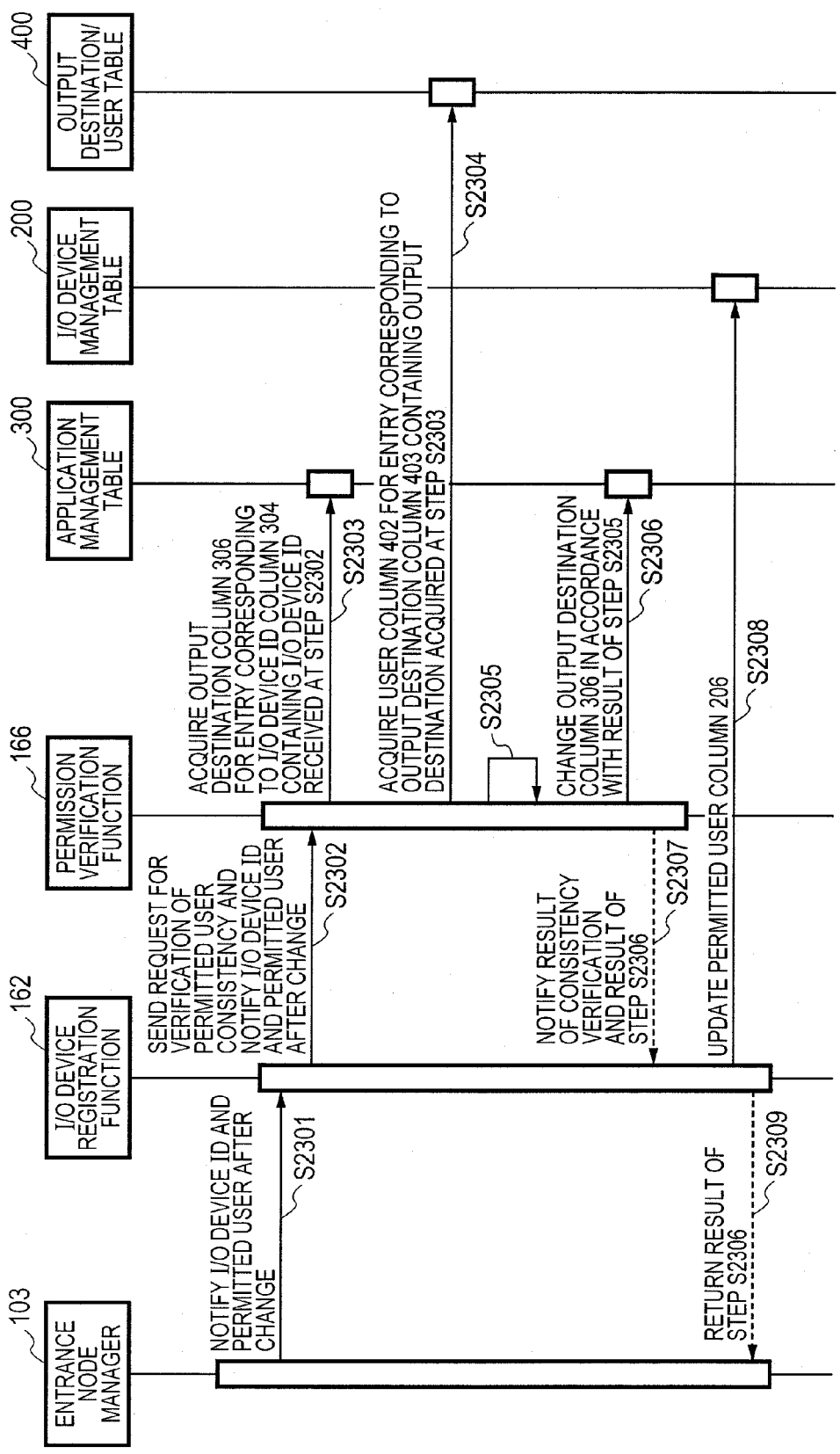
FIG. 23 is a flowchart exemplifying the processing according to a sixth embodiment in which an entrance node manager changes a permission scope of I/O devices.

FIG. 23 is a sequence diagram showing an operation according to the sixth embodiment during which the entrance node manager 103 changes a permitted user for the I/O device. As shown in FIG. 23, the operation is associated with the entrance node manager 103, the I/O device registration function 162, the permission verification function 166, the application management table 300, the I/O device management table 200, and the output destination/user table 400.

Using the console 114, the entrance node manager 103 notifies the I/O device registration function 162 of an I/O device ID targeted for setting change and a permitted user after the setting change (step S2301).

The I/O device registration function 162 requests the permission verification function 166 to verify the permitted user's consistency and transfers the I/O device ID and the permitted user after the setting change (step S2302).

The permission verification function 166 searches the I/O device ID column 304 in the application management table 300 for an entry containing the I/O device ID acquired at step S2302 and acquires the output destination column 306 for the entry (step S2303).

The permission verification function 166 then searches the output destination column 403 in the output destination/user table 400 for an entry containing the application output destination acquired at step S2303 and acquires the user column 402 for the entry (step S2304).

At step S2305, the permission verification function 166 verifies the consistency by comparing the user list corresponding to the application output destination acquired at step S2306 with the permitted user after the change acquired at step S2302. Specifically, the permission verification function 166 performs the determination at steps S2104 through S2108 in FIG. 21 according to the fourth embodiment. The permission verification function 166 determines whether the user corresponding to the application output destination acquired at step S2304 is contained in a range of permitted users for the I/O device after the change acquired at step S2302 (step S2305). When the user is not contained in the range, the permission verification function 166 restricts the application output destination and changes the output destination column 306 in the application management table 300 so that the user is contained in the range (step S2306). A technique similar to the fifth embodiment needs to be used for restricting the application output destination in accordance with a change in the application management table 300.

The permission verification function 166 notifies the I/O device registration function 162 of the result of the consistency verification and the result of the change in the application management table at step S2306 (step S2307).

The I/O device registration function 162 searches the I/O device ID column 201 in the I/O device management table 200 for an entry corresponding to the I/O device ID received at step S2301 and changes the permitted user column 206 for the entry to the permitted user after the change received at step S2301 (step S2308). The I/O device registration function 162 returns the change result at step S2306 to the entrance node manager 103 (step S2309).

Seventh Embodiment

The seventh embodiment will be described. The seventh embodiment can configure permitted users in units of APIs (Application Program Interfaces) provided by the I/O device, not in units of I/O devices.

The seventh embodiment uses the same physical configuration as that of the first embodiment except the I/O device management table 200 and the application management table 300. The following describes only differences from the first embodiment and omits the same description as the first embodiment.

FIG. 24 shows an I/O device management table 2400 according to the seventh embodiment.

As shown in FIG. 24, the I/O device management table 2400 according to the seventh embodiment contains an I/O device ID column 2401, an I/O device name column 2402, a connection column 2403, an I/O device address column 2404, an owner column 2405, an API column 2406, and a permitted user column 2407.

The columns 2401 through 2405 are equivalent to the columns 201 through 205 in the I/O device management table 200 according to the first embodiment.

The API column 2406 contains an API provided by the I/O device. According to the embodiment, for example, the IP camera as an I/O device provides an image capture API and a direction change actuator API.

The permitted user column 2407 stores a user permitted to each API in the API column 2406. According to the embodiment, IP camera 1 with I/O device ID Dev-1 permits the image capture API and the direction change actuator API both to user A only. IP camera 2 with I/O device ID Dev-2 permits the image capture API to users A and B and permits the direction change actuator API to user A only.

FIG. 25 shows an application management table 2500 according to the seventh embodiment.

As shown in FIG. 25, the application management table 2500 according to the seventh embodiment contains an application ID column 2501, an application name column 2502, a deploying user column 2503, an I/O device ID column 2504, an I/O device name column 2505, an API column 2506, and an output destination column 2507.

The columns 2501 through 2505 and 2507 are equivalent to columns 301 through 305 and 306 in the application management table 300 according to the first embodiment.

The API column 2506 stores an API, not an I/O device used by the application. According to the embodiment, applications with application IDs AP-11 and AP-12 use the image capture API for IP cameras 1 and 2, respectively, but do not use the direction change actuator API.

Eighth Embodiment

The eighth embodiment will be described. According to the eighth embodiment, the application 161 outputs data to processor blade 131. In addition, the user device 104 has the function that uses the processor blade 131 to access the application for making a request. The permitted user's consistency is verified when the application is accessed for a request. There may be a case where the user device 104 acquires data from the entrance node 100 at a desired timing. There may be another case where the application 161 uses the direction change actuator API shown in the I/O device management table 2400 in FIG. 24 according to the seventh embodiment and the user device 104 accesses the application 161 to operate the direction change actuator API. The eighth embodiment may be applicable for these cases.

The eighth embodiment uses the same physical configuration as that of the first embodiment except the I/O device management table 200 and an operation sequence. The following describes only differences from the first embodiment and omits the same description as the first embodiment.

FIG. 26 shows an application management table 2600 according to the eighth embodiment.

As shown in FIG. 26, the application management table 2600 according to the eighth embodiment contains an application ID column 2601, an application name column 2602, an deploying user column 2603, an I/O device ID column 2604, an I/O device name column 2605, and an access-permitted user column 2606

The columns 2601 through 2605 are equivalent to columns 301 through 305 in the application management table 300 according to the first embodiment.

The access-permitted user column 2606 stores the name of a user who is permitted to access the application.

The application according to the embodiment is assumed to be an image recorder. The user as a requester accesses the application and requests an image recorded by the application for acquisition (PULL).

FIG. 27 is a sequence diagram showing an operation according to the eighth embodiment during which the user device 104 issues a PULL request to the application 161 having means or a function for receiving the request. As shown in FIG. 27, the operation is associated with the user device 104, the application middleware 160, the permission verification function 166, the application management table 2600, and the output destination/user table 400.

The user device 104 sends a PULL request and an application ID through the processor blade 131, the switch 132, and the network interface 112. The application middleware 160 accepts the PULL request and the application ID (step S2701).

The application middleware 160 requests the permission verification function 166 to verify the permitted user's consistency and passes the requester's address and the application ID received at step S2701 (step S2702).

The permission verification function 166 searches the application ID column 2601 in the application management table 2600 for an entry containing the application ID acquired at step S2702 and acquires the access-permitted user column 2606 for the entry (step S2703).

The permission verification function 166 searches the output destination column 403 in the output destination/user table 400 for an entry containing the requester IP address acquired at step S2702 and acquires the user column 402 for the entry (step S2704).

At step S2705, the permission verification function 166 verifies the consistency between the user accessible to the application acquired at step S2703 and the user corresponding to the requester's IP address acquired at step S2704. Specifically, the permission verification function 166 performs the determination equivalent to that at step S904 in FIG. 9 according to the first embodiment.

The permission verification function 166 returns the result of consistency verification to the application middleware 160 (step S2706).

When the result at step S2706 is successful, the application middleware 160 allows the application to perform the request receive at step S2701 (step S2707) and returns the execution result to the user device 104 (step S2708). When the result at step S2706 is unsuccessful, the application middleware 160 does not allow the application to perform the request receive at step S2701 (step S2707) and returns the inconsistency of the permitted user to the user device 104 (step S2708).

Figure 28:
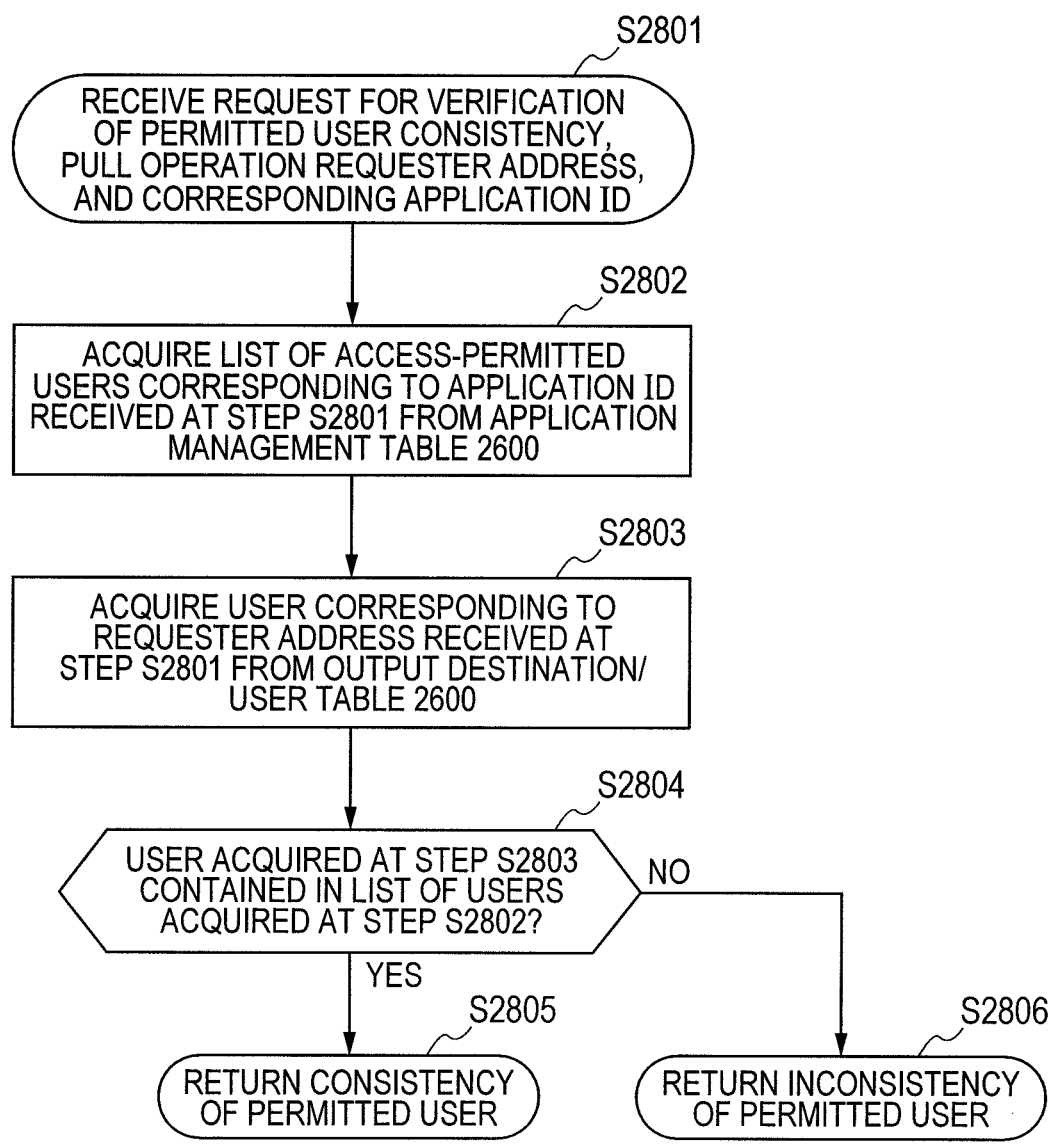
FIG. 28 is a sequence diagram exemplifying the processing according to the eighth embodiment for verifying access permission of an application.

FIG. 28 is a flowchart showing an operation of the permission verification function 166 according to the eighth embodiment.

As shown at step S2702 in FIG. 27, the permission verification function 166 receives the request to verify the permitted user's consistency, the requester's address, and the application ID (step S2801).

As shown at step S2703 in FIG. 27, the permission verification function 166 searches the application ID column in the application management table 2600 for an entry containing the application ID received at step S2801 and acquires the access-permitted user column 2606 for the entry (step S2802).

As shown at step S2704 in FIG. 27, the permission verification function 166 searches the output destination column 403 in the output destination/user table 400 for an entry containing the requester's IP address received at step S2801 and acquires the user column 402 for the entry (step S2803).

As shown at step S2705 in FIG. 27, the permission verification function 166 verifies the consistency between the user corresponding to the requester's address acquired at step S2803 and the user accessible to the application acquired at step S2802. Similarly to step S904 in FIG. 9 according to the first embodiment, the permission verification function 166 checks if the requesting user is included in the list of accessible users (step S2804). When the user is included in the list, the permission verification function 166 returns the consistency of the user (step S2805). Otherwise, the permission verification function 166 returns the inconsistency of the user (step S2806).

Ninth Embodiment

The ninth embodiment will be described. According to the ninth embodiment, the entrance node includes two modules, a management module and an application operation module. One management module can manage multiple application operation modules.

Figure 29:
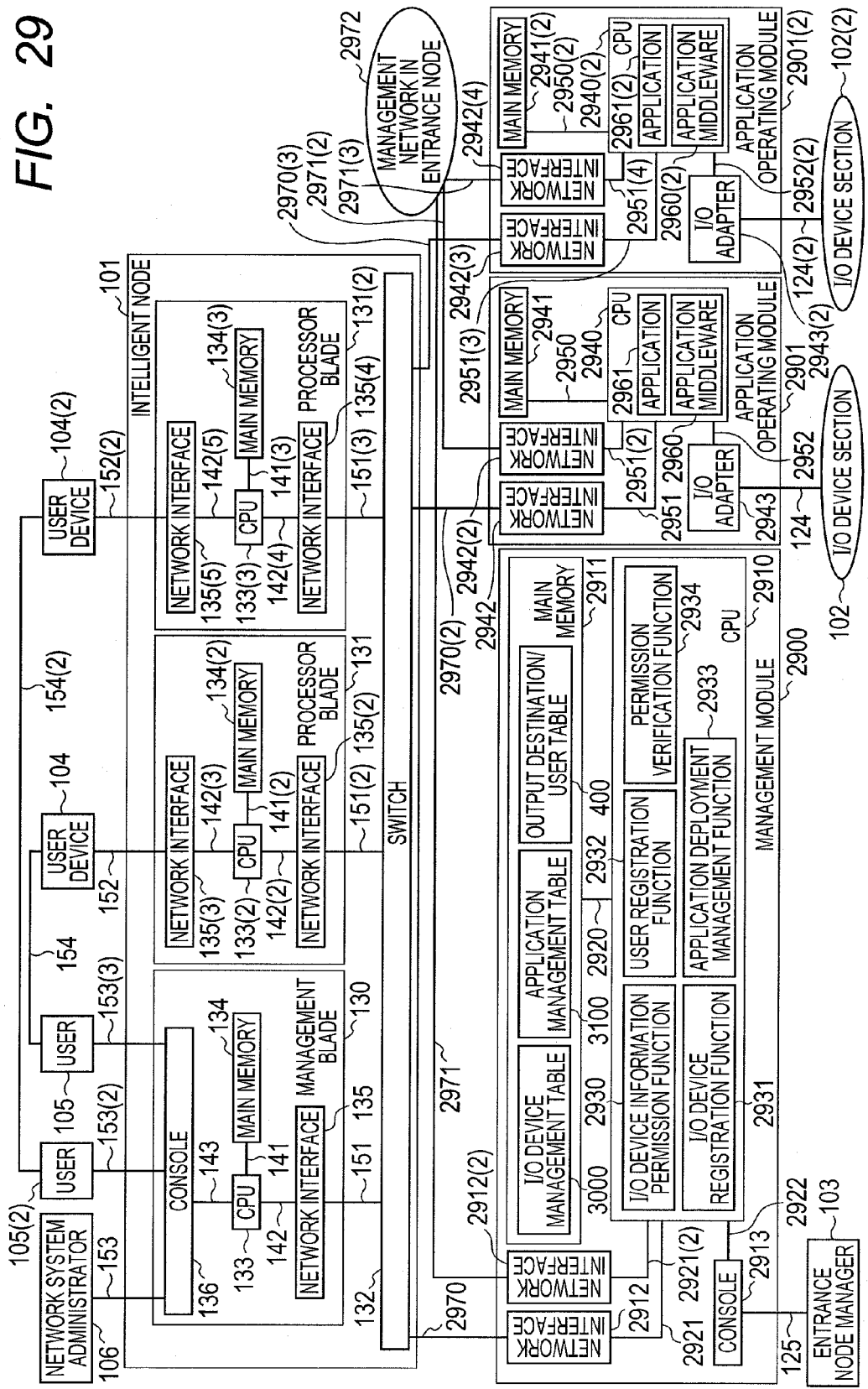
FIG. 29 exemplifies the schematic configuration of a network system according to a ninth embodiment.

FIG. 29 is a block diagram showing the overview of a network according to the ninth embodiment.

The ninth embodiment is equal to the first embodiment except that the entrance node 100 is divided into a management module 2900 and an application operation module 2901 and the connection between the intelligent node 101 and the switch 132 is changed. The following describes only differences from the first embodiment and omits the same description as the first embodiment.

The management module 2900 includes a CPU 2910, main memory 2911, a network interface 2912, and a console 2913. The CPU 2910 is connected to the main memory 2911 through a memory bus 2920. The CPU 2910 is connected to the network interface 2912 and the console 2913 through I/O buses 2921 and 2922, respectively.

The CPU 2910 performs an I/O device information permission function 2930, an I/O device registration function 2931, a user registration function 2932, an application deployment management function 2933, and a permission verification function 2934.

The main memory 2911 stores an I/O device management table 3000, an application management table 3100, and the output destination/user table 400.

The functions 2930 through 2934 operate on the CPU equally to those 162 through 166 according to the first embodiment but use different data in accordance with the change of the I/O device management table 3000 and the application management table 3100 in the main memory 2911.

The application operation module 2901 includes a CPU 2940, main memory 2941, a network interface 2942, and an I/O adapter 2943. The CPU 2940 is connected to the main memory 2941 through a memory bus 2950. The CPU 2940 is connected to the network interface 2942 and the I/O adapter 2943 through I/O buses 2951 and 2952, respectively.

The CPU 2940 performs application middleware 2960 and an application 2961 using the same.

The management module 2900 and the application operation module 2901 each include two network interfaces 2912, 2942. One network interface is connected to a backbone network 2970 and then to the switch 132 of the intelligent node 101. The other network interface is connected to a network 2971 in the entrance node and is concentrated at a management network 2972 in the entrance node. The management module 2900 can manage the application operation module 2901 using the network 2971 in the entrance node.

As described in the second embodiment, the management module 2900 and the application operation module 2901 each may have two physical network interfaces 2912, 2942. Alternatively, one network interface may be assumed to be two logical interfaces using a VLAN, for example.

FIG. 30 shows an I/O device management table 3000 according to the ninth embodiment.

As shown in FIG. 30, the I/O device management table 3000 according to the ninth embodiment contains an application operation module number column 3001, an I/O device ID column 3002, an I/O device name column 3003, a connection column 3004, an I/O device address column 3005, and an owner column 3006.

The application operation module number column 3001 indicates numbers assigned to application operation modules. The embodiment represents application operation module numbers as Func-1, Func-2, and so on.

The columns 3002 through 3007 are equal to those 201 through 205 in the I/O device management table 200 according to the first embodiment.

FIG. 31 shows the application management table 3100 according to the ninth embodiment.

As shown in FIG. 31, the application management table 3100 according to the ninth embodiment contains an application operation module number column 3101, an application ID column 3102, an application name column 3103, a deploying user column 3104, an I/O device ID column 3105, an I/O device name column 3106, and an output destination column 3107.

The application operation module number column 3101 indicates numbers assigned to application operation modules similarly to the application operation module number column 3001 in the I/O device management table 3000 as shown in FIG. 30. Application operation module numbers are also represented as Func-1, Func-2, and so on.

The columns 3102 through 3107 are equal to those 301 through 306 in the application management table 300 according to the first embodiment.

According to the ninth embodiment, the I/O device management table 3000 and the application management table 3100 contain the application operation module number columns 3001 and 3101. Therefore, the management module 2900 can identify the multiple application operation modules 2901 for managing them independently.

While there have been described specific preferred embodiments of the present invention, it is to be distinctly understood that the present invention is not limited thereto. For example, the invention is not limited to the network systems each including two layers of network nodes as shown in FIGS. 1, 10, 14, and 29. The invention is also applicable to a network system including three or more layers by networking the topmost node such as a data center that is positioned higher than the intelligent node. In this case, the network system administrator can also enter various pieces of information from a server or a management blade for the higher-layer node such as the data center.

The invention is available as an information processing system suitable for the permission management that allows multiple users to share a sensor controller or an image monitoring system for factory supervision.

The invention claimed is:

1. A network node comprising:
a processing section for performing an application that accepts data input from one or more I/O devices, processes data input from the I/O device, and outputs data; and
a storage section for storing a permission scope of the I/O device, and an output destination of the application,
wherein the processing section determines whether to install the application by verifying that the output destination of the application is included in the permission scope of the I/O device for supplying data processed by the application,
wherein the processing section accepts installation of the application by restricting the output destination of the application so as to be included in the permission scope of the I/O device for supplying data processed by the application.

2. The network node according to claim 1, comprising:
one interface section used for accepting installation of the application; and
another interface section used for the application to output data.

3. The network node according to claim 1,
wherein the processing section resolves domain names of an output destination and a permission scope of the I/O device to determine whether the output destination of the application is included in the permission scope of the I/O device for supplying data processed by the application.

4. The network node according to claim 1,
wherein the processing section determines whether the installed application can output data by verifying that the output destination is included in a permission scope of the I/O device for supplying data processed by the application.

5. The network node according to claim 1,
wherein, when a permission scope of the I/O device is changed, the processing section restricts an output destination of the application for processing data from the I/O device so as to be included in the changed permission scope.

6. The network node according to claim 1,
wherein a permission scope is configured for each function provided by the I/O device.

7. The network node according to claim 1,
wherein the application includes means that receives a request for information; and
wherein, when the application receives the request, the processing section determines whether to accept the request by verifying that a requester is included in a permission scope of the I/O device for supplying data to the application.

8. The network node according to claim 1, comprising:
a first node that accepts installation of the application; and
a second node that is physically separated from the first node, includes the I/O device, and performs the application.

9. An information processing system comprising:
a plurality of I/O devices; and
a network node for performing an application that processes data input from the I/O device and outputs data,
wherein the network node can store permission scope data for the I/O device, and output destination data of the application, and determines whether installation of the application can be accepted by verifying that an output destination of the application is included in a permission scope of the I/O device for supplying data processed by the application based on the stored permission scope data, and the stored output destination data,
wherein the network node accepts installation of the application by restricting the output destination of the application so as to be included in the permission scope of the I/O device for supplying data processed by the application.

10. The information processing system according to claim 9,
wherein the network node includes one interface section used for accepting installation of the application and another interface section used for the application to output data.

11. The information processing system according to claim 9,
wherein the network node resolves domain names of an output destination and a permission scope of the I/O device to determine whether the output destination of the application is included in the permission scope of the I/O device for supplying data processed by the application.

12. The information processing system according to claim 9,
wherein the network node configures a permission scope for each function provided by the I/O device.

13. The information processing system according to claim 9,
wherein the network node includes:
a first node that accepts installation of the application; and
a second node that is physically separated from the first node, includes the I/O device, and performs the application.

14. An information processing method for a network node to perform an application that accepts data input from one or more I/O devices, processes data input from the I/O device, and outputs data, the method comprising:
storing permission scope data for the I/O device, and output destination data of the application in the network node;
verifying that an output destination of the application is included in a permission scope of the I/O device for supplying data processed by the application based on the stored permission scope data, and the stored output destination of the application;
determining whether installation of the application can be accepted; and
restricting the output destination of the application so as to be included in the permission scope of the I/O device for supplying data processed by the application.

* * * * *